(12) United States Patent
Yagishita

(10) Patent No.: US 7,653,714 B2
(45) Date of Patent: Jan. 26, 2010

(54) COMPUTER-READABLE RECORDING MEDIUM WITH SYSTEM MANAGING PROGRAM RECORDED THEREIN, SYSTEM MANAGING METHOD AND SYSTEM MANAGING APPARATUS

(75) Inventor: Keiji Yagishita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 609 days.

(21) Appl. No.: 11/342,945

(22) Filed: Jan. 30, 2006

(65) Prior Publication Data

US 2007/0078972 A1    Apr. 5, 2007

(30) Foreign Application Priority Data

Oct. 4, 2005    (JP) ............................. 2005-290971

(51) Int. Cl.
G06F 15/173    (2006.01)
(52) U.S. Cl. ..................... 709/223; 707/204; 455/412.1
(58) Field of Classification Search .................. 709/223, 709/224, 225
See application file for complete search history.

(56) References Cited

U.S. PATENT DOCUMENTS

| | | | | | |
|---|---|---|---|---|---|
| 5,758,359 | A | * | 5/1998 | Saxon | 707/204 |
| 6,078,955 | A | * | 6/2000 | Konno et al. | 709/224 |
| 7,085,904 | B2 | * | 8/2006 | Mizuno et al. | 711/162 |
| 7,120,739 | B2 | * | 10/2006 | Fujimoto et al. | 711/113 |
| 7,483,928 | B2 | * | 1/2009 | Asano et al. | 707/204 |
| 2003/0012182 | A1 | * | 1/2003 | Sato | 370/352 |
| 2003/0135439 | A1 | * | 7/2003 | Yagishita | 705/36 |
| 2004/0192260 | A1 | * | 9/2004 | Sugimoto et al. | 455/412.1 |

FOREIGN PATENT DOCUMENTS

| | | |
|---|---|---|
| JP | 5-173873 | 7/1993 |
| JP | 2001-184175 | 7/2001 |
| JP | 2004-227359 | 8/2004 |
| JP | 2006260355 A * | 9/2006 |

OTHER PUBLICATIONS

Louis et al., Management Issues for High-Performance Storage Systems., Storage—At the Forefront of Information Infrastructures., Proceedings of the Fourteenth IEEE Symposium on Mass Storage Systems, 1995. Monterey, CA., Sep. 11-14, 1995.*

* cited by examiner

Primary Examiner—Quang N. Nguyen
Assistant Examiner—Kostas Katsikis
(74) Attorney, Agent, or Firm—Greer, Burns & Crain, Ltd.

(57) ABSTRACT

A computer-readable recording medium stores therein a system managing program for assisting in constructing an environment for efficiently operating a system depending on the access to data from an application. An application information collecting unit acquires management information representing access to data from an application function which is realized when a server of a network system executes an application program, and registers the acquired management information in a system management table. A system information collecting unit acquires resource management information owned by an operating system of the server, and registers the acquired resource management information in the system management table. An information analyzing unit refers to the system management table and determines whether the management of resources depending on the access to the data from the application function is adequate or not.

7 Claims, 24 Drawing Sheets

140 DATA ATTRIBUTE TABLE

| DATA IDENTIFIER | DATA ATTRIBUTES | | | | | | | STORAGE IDENTIFIER |
|---|---|---|---|---|---|---|---|---|
| | UPDATED DATE | SIZE | OWNER | LEVEL OF IMPORTANCE | I/O RESPONSE | RECOVERY FREQUENCY | BACKED UP/ NOT BACKED UP | |
| DATA 1 | 20040101 | 100MB | Tanaka | High | STORED AS ANALYTICAL DATA AT RESPECTIVE SAMPLED TIMES | 360(20020101,....) | BACKED UP | Pool1 |
| DATA 2 | 20001201 | 10KB | Satoh | Middle | | 0 | NOT BACKED UP | Pool1 |
| DATA 3 | 20030831 | 1000MB | yagishita | Middle | | 1(20030201) | BACKED UP | Pool2 |
| DATA 4 | 20050501 | 100MB | Saitoh | Low | | 0 | NOT BACKED UP | Pool3 |

FIG. 5

150 STORAGE ATTRIBUTE TABLE

| STORAGE IDENTIFIER | STORAGE ATTRIBUTES | | | | | |
|---|---|---|---|---|---|---|
| | PRICE | PERFORMANCE | USED CAPACITY | UNUSED CAPACITY | I/O RESPONSE | BACKED UP/ NOT BACKED UP |
| Pool1 | High | High | 100GB | 500GB | STORED AS ANALYTICAL DATA AT RESPECTIVE SAMPLED TIMES | BACKED UP |
| Pool2 | Low | Middle | 100GB | 100GB | | BACKED UP |
| Pool3 | Low | Low | 10GB | 9GB | | NOT BACKED UP |

FIG. 6

COMPUTER-READABLE RECORDING MEDIUM WITH SYSTEM MANAGING PROGRAM RECORDED THEREIN, SYSTEM MANAGING METHOD AND SYSTEM MANAGING APPARATUS

CROSS-REFERENCE TO RELATED APPLICATIONS

This application is based upon and claims the benefits of priority from the prior Japanese Patent Application No. 2005-290971, filed on Oct. 4, 2005, the entire contents of which are incorporated herein by reference.

BACKGROUND OF THE INVENTION (1) Field of the Invention

The present invention relates to a computer-readable recording medium recording therein a system managing program for enabling a computer to manage a system made up of a plurality of servers, a system managing method, and a system managing apparatus, and more particularly to a computer-readable recording medium recording therein a system managing program for allowing hardware resources to be automatically added, a system managing method, and a system managing apparatus.

(2) Description of the Related Art

At present, various services are provided through networks. When the number of users of a system increases, the load on the system increases in operation. Therefore, a need arises to strengthen the functions of the system. Generally, when a computer system runs short of sufficient processing capabilities, resources including servers and storage devices are added to make up for the shortage, reconstructing the system in its entirety.

As a computer system becomes larger in scale and has its system configuration frequently changed, it becomes difficult to operate the resources efficiently. There have been proposed various techniques for making more efficient the operation of resources such as storage devices, etc. (see, for example, Japanese laid-open patent publication No. 2004-227359, Japanese laid-open patent publication No. 2001-184175, and Japanese laid-open patent publication No. H05-173873).

Conventional systems judge an optimum system configuration based on various management information, representing a free disk capacity, etc., which is managed by an OS (Operating System). Actually, however, since functions based on an application program (hereinafter simply referred to as "application") perform processing activities using resources, the judgment may possibly be inadequate if it is based on only the management information from the OS.

For example, for storing data in a storage device (including a RAID (Redundant Arrays of Inexpensive Disks) device) connected to a computer system, an application running on the computer system writes the data on a disk that is assigned to the application. The written data is updated or deleted by the application.

Data processed by an application includes various attributes such as updated date, size, owner, I/O response, importance, and recovery frequency. Some of these attributes, e.g., importance and recovery frequency, can only be grasped on the application. If resource overage and shortage are judged with disregard to those attributes, then the following problems arise:

1) A general file system has information as to the time and date of final access to data, but not information as to access frequency. If data of low access frequency is left undeleted in a fast, expensive disk device, then the disk device ROI (Return On Investment) becomes low. Stated otherwise, data of low access frequency does not need to be stored in a fast, expensive disk device. When the data is transferred to another medium, the high-functionality disk device can effectively be utilized.

2) If data of low access frequency is left undeleted in a disk device, reducing its free disk capacity, then the I/O response, i.e., a period of time spent after an access request is sent to the disk device until a response is returned from the disk device, of the disk device becomes slow. This phenomenon manifests itself when access concentrates on a certain location of the disk.

3) Recent computer systems experience frequent configurational changes such as the addition of a disk device. Because of such frequent configurational changes, even if the computer system has an access monitoring function, the added disk device may possibly escape from being monitored. Therefore, it is difficult to keep on monitoring access from an application to data in the disk device, using a monitoring function different from the application.

4) Scheduled automatic data backup is performed by a dedicated application. Since such a backup schedule has not been used as information for system operation management, the data backup has been inefficient. For example, backup management does not ensure data backup in view of data updating information, i.e., performs differential data backup with no information as to whether it is optimally scheduled or not, but backs up data periodically once a day or a week regardless of the risk of losing the data. The data backup practice tends to significantly affect all aspects from application defects to system disaster, and needs to go through substantial redoing.

5) The administrator manually presets a disk whose data has to be backed up. When hardware is added or removed, the administrator is liable to forget data backup.

As described above, it has heretofore been difficult to perform efficient system management depending on the processing details of an application because of a lack of management information obtained from the application.

SUMMARY OF THE INVENTION

It is therefore an object of the present invention to provide a computer-readable recording medium with a system managing program recorded therein, a system managing method, and a system managing apparatus which assist in constructing an environment for efficiently operating a system depending on the access to data from an application.

To achieve the above object, there is provided a recording medium readable by a computer and storing a system managing program for assisting in optimizing a system configuration. The system managing program enables the computer to function as application information collecting means for acquiring management information representing access to data from an application function which is realized when a server of a network system executes an application program, and registering the acquired management information in a system management table, system information collecting means for acquiring resource management information owned by an operating system of the server, and registering the acquired resource management information in the system management table, and information analyzing means for referring to the system management table and determining whether the management of resources depending on the access to the data from the application function is adequate or not.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram showing an example of a data structure of a data attribute table.

FIG. 6 is a diagram showing an example of a data structure of a storage attribute table.

DESCRIPTION OF THE PREFERRED EMBODIMENTS

Embodiments of the present invention will be described below with reference to the drawings.

Figure 1:
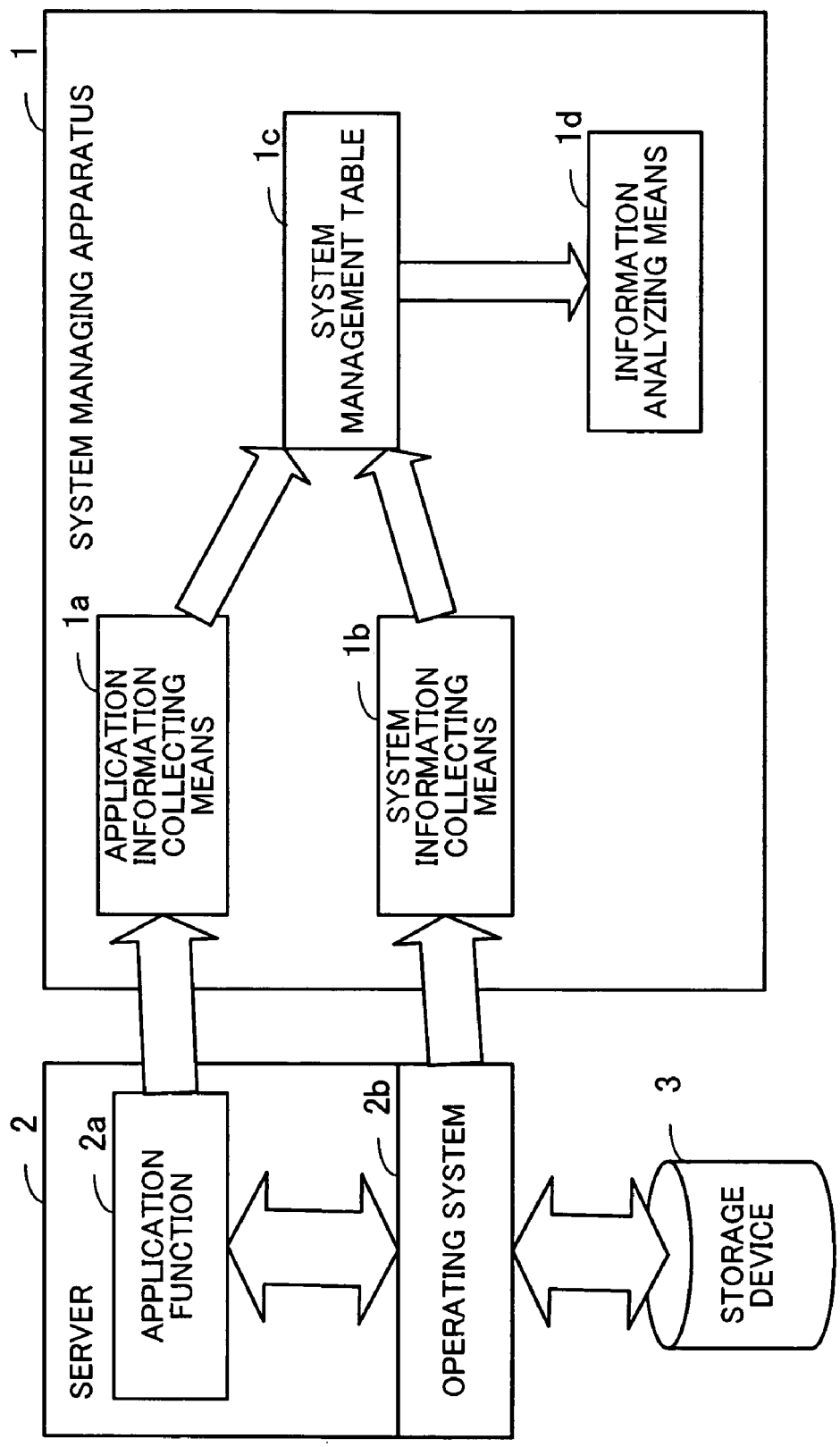
FIG. 1 is a block diagram showing an embodiment of the present invention.

FIG. 1 shows in block form an embodiment of the present invention. As shown in FIG. 1, a system managing apparatus 1 is connected to a server 2 of a network system. Another device, e.g., a storage device 3, is connected to the network system.

The system managing apparatus 1 has an application information collecting means 1a, a system information collecting means 1b, a system management table 1c, and an information analyzing means 1d, for assisting in optimizing a system configuration.

The application information collecting means 1a acquires management information representing access to data from an application function 2a which is realized when the server 2 of the network system executes an application program, and registers the acquired management information in the system management table 1c. For example, if the application function 2a has a function to back up data, then the application information collecting means 1a collects information as to a backup schedule and a restored history of backup data.

The system information collecting means 1b acquires resource management information owned by an operating system 2b of the server 2, and registers the acquired resource management information in the system management table 1c. For example, the system information collecting means 1b collects file systems owned by the operating system 2b and information as to a history of data access through the file systems.

The system management table 1c stores management information collected by the application information collecting means 1a and management information collected by the system information collecting means 1b, in relation to data identification information and storage device identification information, for example.

The information analyzing means 1d refers to the management information stored in the system management table 1c, and determines whether the management of resources depending on the access of the data from the application function 2a is adequate or not. For example, the information analyzing means 1d can extract data that has escaped from a backup schedule from the data managed by a file system. The information analyzing means 1d can also determine the updating of data included in a backup schedule from the management information acquired from the operating system to determine the adequacy of backup intervals, etc.

The system managing apparatus 1 thus constructed operates as follows: The application information collecting means 1a acquires management information representing access to data from the application function 2a, and registers the acquired management information in the system management table 1c. The system information collecting means 1b acquires resource management information owned by the operating system 2b of the server 2, and registers the acquired resource management information in the system management table 1c. The information analyzing means 1d refers to the management information stored in the system management table 1c, and determines whether the management of resources depending on the data access by the application function 2a is adequate or not.

As a result, the system managing apparatus 1 is capable of appropriately determining whether the management of the system by the application function 2a and the operating system 2b is adequate or not. For example, the system managing apparatus 1 can appropriately determine the adequacy of a backup schedule and also the adequacy of a data storage device, e.g., whether data accessed by an application at a higher frequency is stored in a higher-performance storage device or not.

The analytic results from the information analyzing means 1d can be output as visual graphs for the system administrator to easily recognize results of tendency analyses.

Based on the analytic results from the information analyzing means 1d, the system managing apparatus 1 can automatically perform an automatic data migration, an automatic data relocation for higher performance, an automatic backup schedule change, etc.

A system comprising a combination of the functions illustrated in FIG. 1 and an automatic migrating function according to the embodiment of the present invention will be described in detail below.

Figure 2:
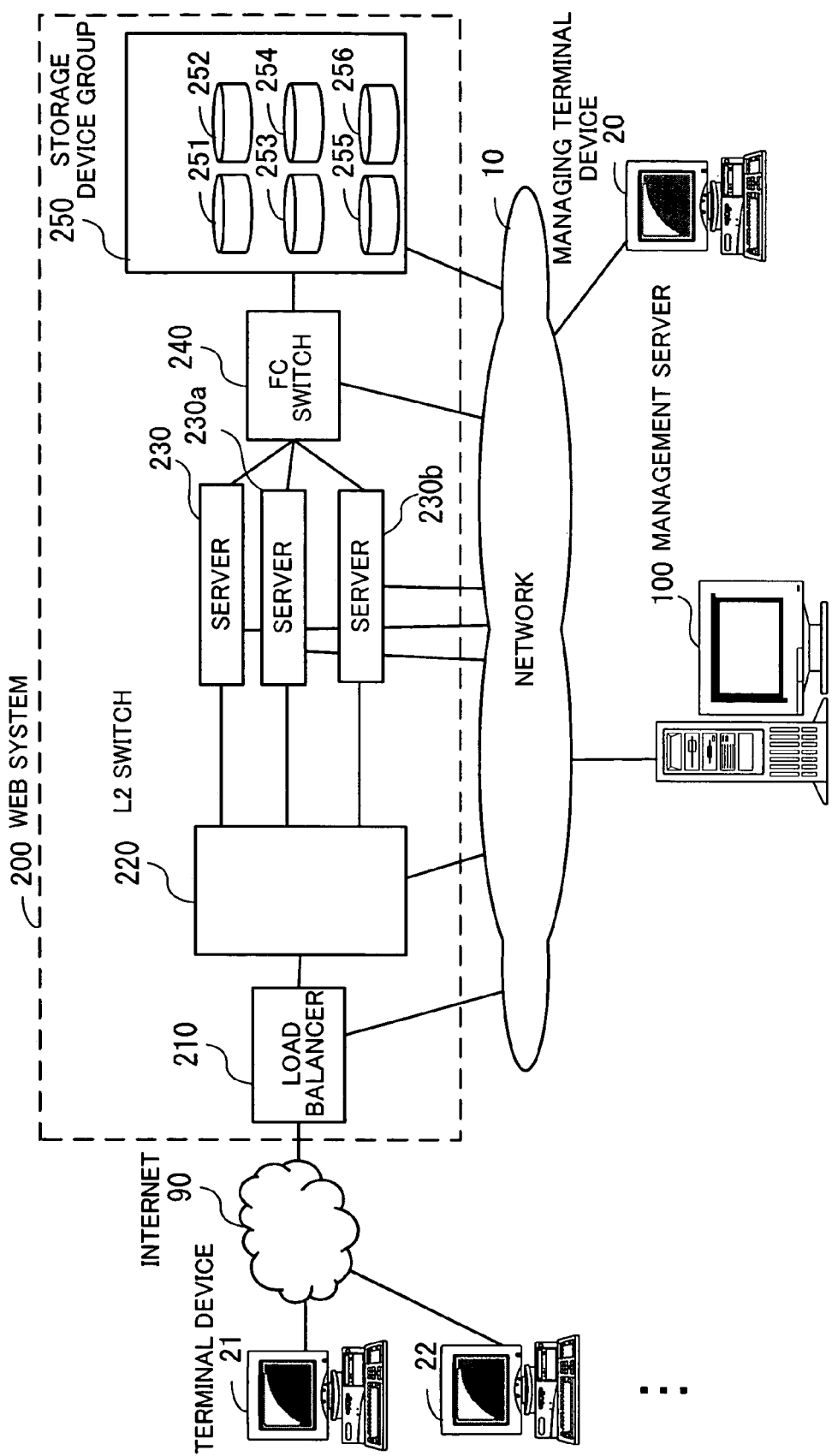
FIG. 2 is a block diagram of a system arrangement according to the embodiment of the present invention.

FIG. 2 shows in block form a system arrangement according to the embodiment of the present invention. As shown in FIG. 2, a Web system 200 provides various services to a plurality of terminal devices 21, 22, . . . that are connected to the Internet 90. The Web system 200 is managed by a management server 100 that is connected thereto through a network 10. A managing terminal device 20 is connected to the management server 100 through the network 10.

The Web system 200 has a load balancer 210, a level 2 (L2) switch 220, a plurality of servers 230, 230a, 230b, a fiber channel (FC) switch 240, and a storage device group 250 including a plurality of storage devices 251 through 256.

The load balancer 210 is connected to the Internet 90 for communications with the terminal devices 21, 22, . . . . The load balancer 210 also monitors the loads processed by servers that are in operation, and distribute processing requests from the terminal devices 21, 22, . . . to the servers for load deconcentration.

The L2 switch 220 is connected between the load balancer 210 and the servers 230, 230a, 230b. The L2 switch 220 transfers processing requests distributed by the load balancer 210 to the corresponding servers.

The servers 230, 230a, 230b perform respective processes depending on processing requests from the terminal devices 21, 22, . . . , and return processed results to the terminal devices 21, 22, . . . . As a general rule, at least one of the servers 230, 230a, 230b is reserved as a backup server, which does not provide services while the other servers are performing their processes. When the servers 230, 230a, 230b perform their processes, they access the storage device group 250 as necessary.

The FC switch 240 is connected between the servers 230, 230a, 230b and the storage device group 250. The FC switch 240 transfers access requests from the servers 230, 230a, 230b to the storage devices 251 through 256 which are specified by the access requests.

The storage device group 250 manages the storage devices 251 through 256. At least one of the storage devices 251 through 256 is pooled as a reserved storage device, and the other storage devices are used by the servers.

The management server 100 is connected to the various components of the Web system 200 through the network 10, and manages how those components are operated. If the Web system 200 runs short of a hardware resource for providing a certain service, then the management server 100 determines the type (a server or a storage device) of the hardware resource to be added. The management server 100 reconstructs the operating configuration of the Web server 200 such that the hardware resource determined to be added will be used to provide the corresponding service.

The managing terminal device 20 is a terminal device that is used by the system administrator. When the results of a tendency analysis of system usage are sent from the management server 200 to the managing terminal device 20, the system administrator can determine whether the system configuration needs to be changed or not.

The system arrangement shown in FIG. 2 allows a server or a storage device for providing each desired service to be added to the Web system 200. Specifically, the management server 100 measures an increase in the amount of usage of a storage device over a certain period of time with respect to each service. Then, the management server 100 compares the measured increase with a threshold for each service, and determines whether only a storage device is to be added or a server is to be added.

If a server is to be added, then the management server 100 copies image data including an OS and various software applications to the server to be added, and activates the server with the OS. The management server 100 sets an IP address, etc. in the activated server.

The management server 100 also reads necessary data from the storage device that is being currently used, and copies the read data to a new storage device. The management server 100 instructs the load balancer 210 to incorporate the server into the service.

If a storage device is to be added, then the management server 100 set the FC switch 240, etc. so that the storage device to be added can be accessed from the corresponding service.

Figure 3:
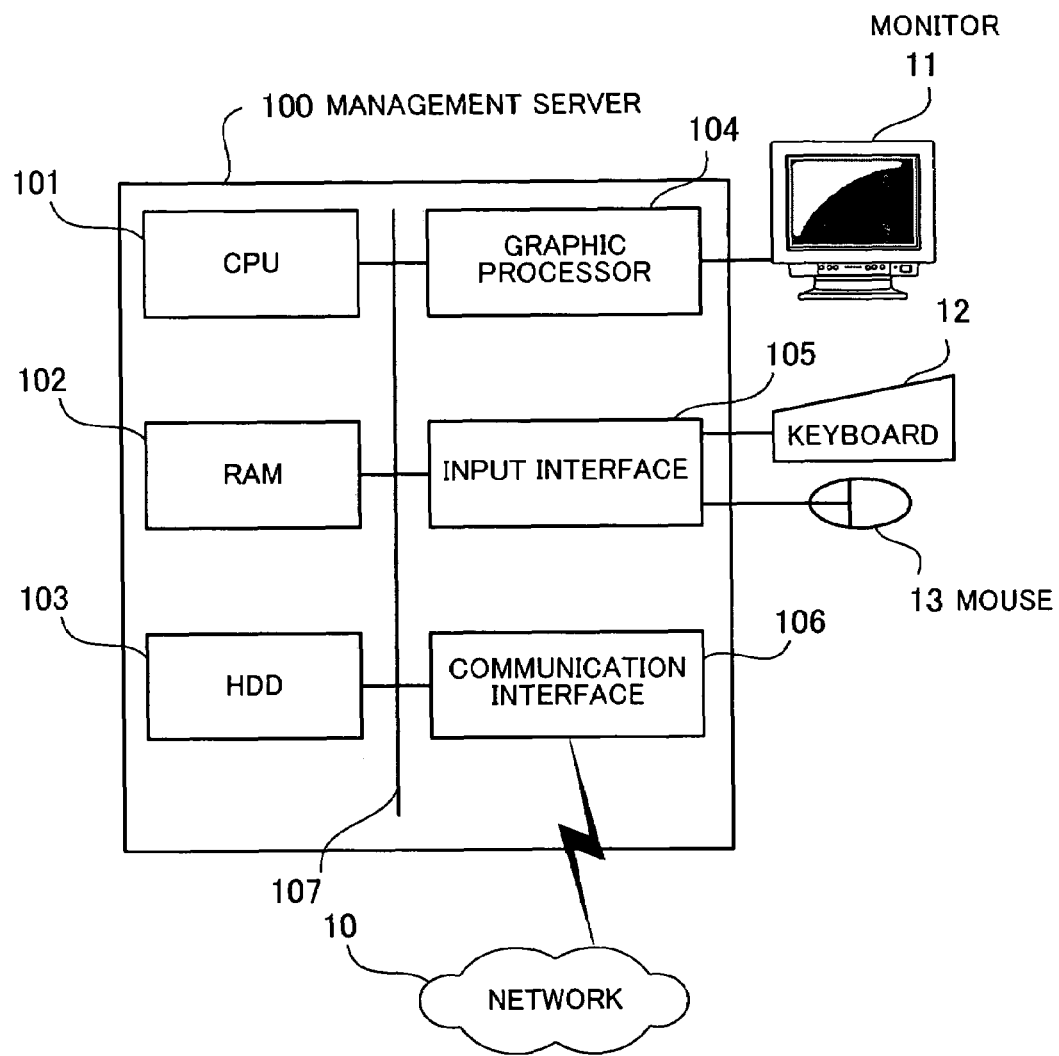
FIG. 3 is a block diagram of a hardware arrangement of a computer according to the embodiment of the present invention.

FIG. 3 shows in block form a hardware arrangement of a computer for use as the management server 100 according to the embodiment of the present invention. The management server 100 is controlled in its entirety by a CPU (Central Processing Unit) 101. To the CPU 101, there are connected a RAM (Random Access Memory) 102, a HDD (Hard Disk Drive) 103, a graphic processor 104, an input interface 105, and a communication interface 106.

The RAM 102 temporarily stores at least a portion of an OS program and application programs to be executed by the CPU 101. The RAM 102 also stores various data required in processing sequences of the CPU 101. The HDD 103 stores the OS program and the application programs.

A display monitor 11 is connected to the graphic processor 104. The graphic processor 104 displays images on the screen of the display monitor 11 according to instructions from the CPU 101. A keyboard 12 and a mouse 13 are connected to the input interface 105. The input interface 105 transmits signals from the keyboard 12 and the mouse 13 to the CPU 101 through a bus 107.

The communication interface 106 is connected to the network 10 for sending data to and receiving data from other computers through the network 10.

The hardware arrangement described above is capable of performing processing functions according to the embodiment of the present invention. Though the hardware arrangement of the management server 100 is illustrated in FIG. 3, each of the servers 230, 230a, 230b and the terminal devices 21, 22, . . . may be of a hardware arrangement similar to the hardware arrangement shown in FIG. 3.

Functions that the management server 100 and the servers 230, 230a, 230b have will be described below.

Figure 4:
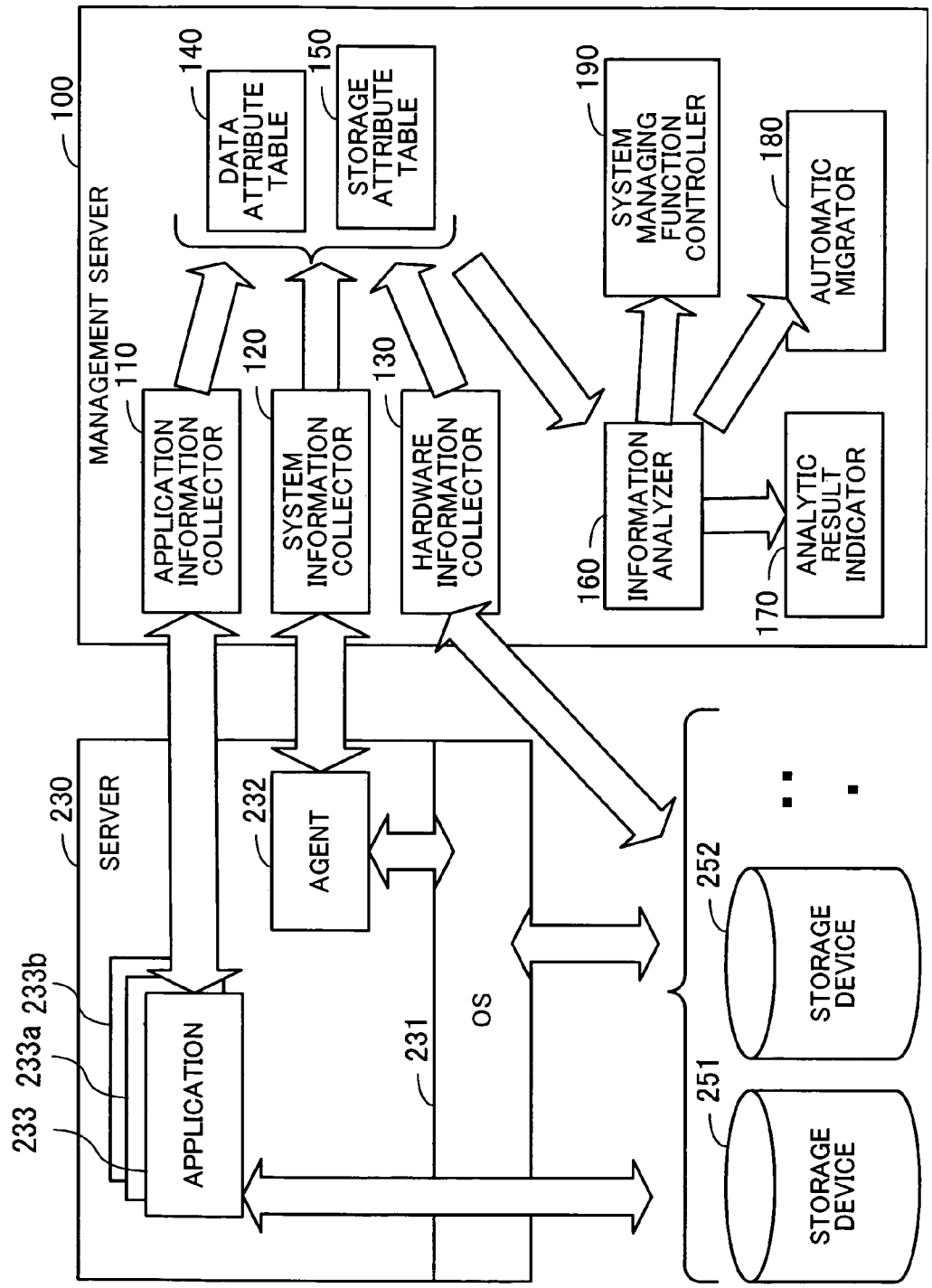
FIG. 4 is a block diagram showing processing functions of a management server and servers.

FIG. 4 shows in block form processing functions of the management server 100 and the servers 230, 230a, 230b. In FIG. 4, the server 230 is illustrated and the servers 230a, 230b are omitted from illustration. However, the processing functions of the servers 230a, 230b are identical to those of the server 230. As shown in FIG. 4, the server 230 has an OS 131, an agent 232, and various applications including a plurality of applications 233, 233a, 233b, . . . .

The OS 231 manages the server 230 in its entirety. The OS 231 has file systems for accessing the storage devices 251, 252, and device drivers. According to requests from the applications 233, 233a, 233b, ..., the OS 231 accesses the storage devices 251, 252, ....

The agent 232 sends management information owned by the OS 231 to the management server 100 in response to a request from the management server 100. For example, the agent 232 collects information as to free disk capacities, etc. of the storage devices 251, 252, ... from the file systems of the OS 231, and sends the collected information to the management server 100.

The applications 233, 233a, 233b, ... are processing functions for performing data backup, etc. The applications 233, 233a, 233b, ... acquire data that needs to be processed from the storage devices 251, 252, ..., and store processed data in the storage devices 251, 252, .... Furthermore, in response to a request from the management server 100, the applications 233, 233a, 233b, ... send management information as to access to the storage devices 251, 252, ... to the management server 100.

The management server 100 has an application information collector 110, a system information collector 120, a hardware information collector 130, a data attribute table 140, a storage attribute table 150, an information analyzer 160, an analytic result indicator 170, an automatic migrator 180, and a system managing function controller 190.

The application information collector 110 requests the applications 233, 233a, 233b, ... to send attributes of data managed thereby (data attributes). The application information collector 110 can collect management information by polling when the application information collector 110 needs the management information.

When information representing data attributes is sent from the applications 233, 233a, 233b, ... to the application information collector 110 in response to the request, the application information collector 110 stores the acquired data attributes in the data attribute table 140 and the storage attribute table 150. For example, the application information collector 110 collects information about resources, e.g., data units handled by the applications, such as files, data, and DB capacities, that are generated, updated, and deleted by the applications 233, 233a, 233b, ....

The system information collector 120 requests the agent 232 to send attribute information of data managed by the OS 231. The system information collector 120 can collect data managed by the OS 231 by polling when the system information collector 120 needs the data.

When information representing storage attributes is sent from the agent 232 to the system information collector 120 in response to the request, the system information collector 120 stores the acquired storage attributes in the storage attribute table 150. For example, the system information collector 120 can collect information managed by the OS 231, such as updated date, size, owner of data.

The hardware information collector 130 accesses the storage devices 251, 252, ... and acquires attribute information of the storage devices 251, 252, .... Specifically, the hardware information collector 130 collects data by polling when the hardware information collector 130 needs the attribute information. The hardware information collector 130 stores the acquired attribute information in the storage attribute table 150.

The application information collector 110, the system information collector 120, and the hardware information collector 130 collect information at times according to preset collecting policy definitions.

The information analyzer 160 refers to information registered in the data attribute table 140 and the storage attribute table 150, and analyzes how resources are used. For example, the information analyzer 160 extracts data that has been unaccessed for a predetermined number of days or more, data that needs an I/O response for a predetermined period of time or more, and data that has been recovered a predetermined number of times per month.

The information analyzer 160 then determines resource overage and shortage and also determines whether the allocation of a resource to an application is adequate or not. If there is a resource shortage, then the information analyzer 160 sends information representative of the resource shortage to the analytic result indicator 170. If the information analyzer 160 finds that the system configuration needs to be changed as a result of its information analysis and the system configuration can automatically be changed, then the information analyzer 160 sends a system change instruction to the automatic migrator 180.

The analytic result indicator 170 sends analytic results from the information analyzer 160 to the system administrator according to a communication technology such as electronic mail or the like.

The automatic migrator 180 automatically migrates the system based on an instruction from the information analyzer 160. For example, when the automatic migrator 180 receives an instruction to add a storage device, the automatic migrator 180 makes the pooled storage device operational, and sets the added storage device so as to be accessible from the file system of each server 230, 230a, 230b.

The automatic migrator 180 can move data that has been unaccessed for a predetermined number of days or more and has a level of importance other than "High", from one of the storage devices to a lower-speed hard disk drive. In this manner, the automatic migrator 180 allows the functions of the fast, expensive storage devices to be effectively utilized.

The automatic migrator 180 can also move data that needs an I/O response for a predetermined period of time or more, from one of the storage devices to another equivalent storage device. In this manner, the automatic migrator 180 distributes access to a plurality of storage devices for better I/O responses.

Depending on analytic results from the information analyzer 160, the system managing function controller 190 instructs the applications 233, 233a, 233b installed in the server 230 to operate. For example, the system managing function controller 190 can change settings of backup applications to increase a backup frequency with respect to data that has been recovered a predetermined number of times per month. In this manner, it is possible to reduce data which would otherwise be lost in the event of a system fault for thereby increasing the efficiency of a recovery process.

FIG. 5 shows an example of a data structure of the data attribute table 140. As shown in FIG. 5, the data attribute table 140 includes columns of data identifiers, data attributes, and storage identifiers.

The column of data identifiers lists the identifiers of data, e.g., files, managed by file systems. The column of data attributes lists the attributes of data.

The column of data attributes is divided into a plurality of columns of different attribute types. In the example shown in FIG. 5, these different attribute types include updated date, size, owner, importance, I/O response, recovery frequency, and backed up/not backed up. The column of updated dates lists the last dates when data have been updated. The column of sizes lists data capacities. The column of owners lists the names of the owners of data. The column of importance lists the levels (High, Middle, and Low) of importance of data. The column of I/O responses lists the times required to access data, i.e., the periods of time spent after an access request is sent until a response is returned. The column of recovery frequencies lists the numbers of times that backup data have been recovered within a predetermined period, together with all recovery dates. The column of backed up/not backed up lists information as to whether data have been backed up or not.

The column of storage identifiers lists the identifiers of storage devices in which data are stored.

Of the data attributes listed in the data attribute table 140, the updated dates, the sizes, and the owners represent information that is acquired from the file systems in the OS 231. The data attributes including the levels of importance, the I/O responses, the recovery frequencies, and backed up/not backed up represent information that is acquired from the application 233.

The information listed in the column of I/O responses represent analytical data that is calculated at respective sample times based on the information of the sampled access times.

FIG. 6 shows an example of a data structure of the storage attribute table 150. As shown in FIG. 6, the storage attribute table 150 includes columns of storage identifiers and storage attributes.

The column of storage identifiers lists the identifiers of storage devices. The column of storage attributes lists the attributes of storage devices.

The column of storage attributes is divided into a plurality of columns of different attribute types. In the example shown in FIG. 6, these differ rent attribute types include price, performance, used capacity, unused capacity, I/O response, and backed up/not backed up. The column of prices lists the relative evaluations (High, Middle, and Low) of the prices of storage devices. The column of performances lists the relative evaluations (High, Middle, and Low) of the performances of storage devices. The column of used capacities lists the data storage capacities, which are currently used, of storage devices. The column of unused capacities lists the free capacities of storage devices. The column of I/O responses lists the times required to access storage devices. The column of backed up/not backed up lists information as to whether storage devices have been backed up or not.

The information listed in the column of I/O responses represent analytical data that are calculated at respective sampled access times based on the information of the sampled access times.

The system constructed as described above performs processes described below.

Figure 7:
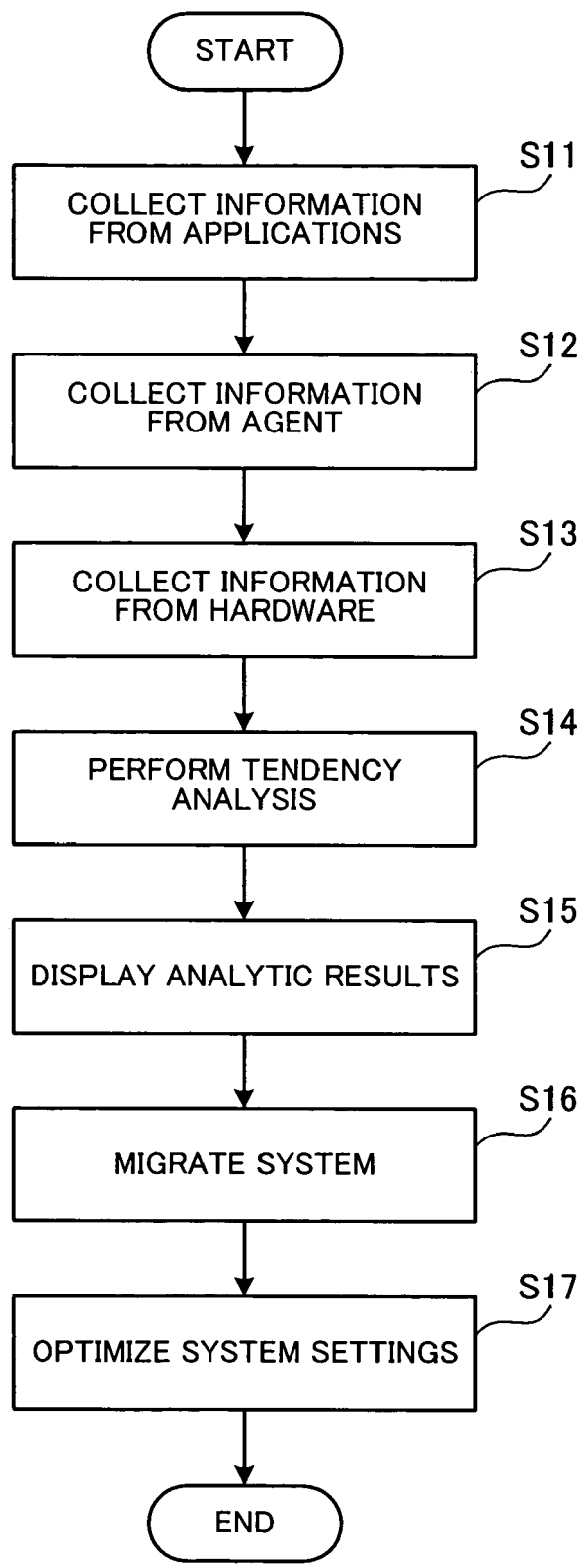
FIG. 7 is a flowchart of a sequence of a system managing process.

FIG. 7 shows a sequence of a system managing process. The system managing process shown in FIG. 7 will be described below with respect to step numbers shown in FIG. 7.

[Step S11] The application information collector 110 collects information as to system management from the applications 233, 233a, 233b, . . . . The application information collector 110 stores the collected information in the data attribute table 140 and the storage attribute table 150.

[Step S12] The system information collector 120 collects system information managed by the OS 231 in the server 230 through the agent 232 of the server 230. The system information collector 120 registers the collected system information in the data attribute table 140 and the storage attribute table 150.

[Step S13] The hardware information collector 130 accesses the storage devices 251, 252, . . . and collects management information that the storage devices 251, 252, . . . have. The hardware information collector 130 registers the collected management information in the data attribute table 140 and the storage attribute table 150.

The information thus collected in steps S11 through S13 is related to each other. Specifically, the attributes (prices, performances, used capacities, etc.) of resources (storage devices, etc.), the attributes (updated dates, sizes, etc.) of data contained in the resources, and policies (whether backup is necessary or not, etc.) are related to each other.

[Step S14] The information analyzer 160 analyzes the information registered in the data attribute table 140 and the storage attribute table 150, and performs a tendency analysis with respect to transitions of values of the various information. For example, the information analyzer 160 determines transitions which average access times of the storage devices 251, 252, . . . undergo.

[Step S15] The analytic result indicator 170 displays results of the tendency analysis on the display monitor 11. For example, the analytic result indicator 170 displays on the display monitor 11 a graph representing a transition of average access times in respective time zones.

[Step S16] The automatic migrator 180 automatically migrates the system depending on the results of the tendency analysis. Specifically, the automatic migrator 180 determines a resource shortage or a resource overage based on the results of the tendency analysis, and displays on the display monitor 11 a proposed system configurational change to realize an appropriate system configuration. When the user enters an input signal accepting the proposed system configurational change, the automatic migrator 180 migrates the system according to the proposed system configurational change.

[Step S17] The system managing function controller 190 optimizes system settings depending on the results of the tendency analysis. Specifically, the system managing function controller 190 outputs a request to update the system settings to the applications 233, 233a, 233b and the agent 232 of the server 230. In response to the updating request, the applications 233, 233a, 233b and the agent 232 updates the settings of various processes. For example, an application for backing up data adds/deletes a backup schedule and a storage device to be backed up.

The system managing process shown in FIG. 7 will be described in detail below.

Figure 8:
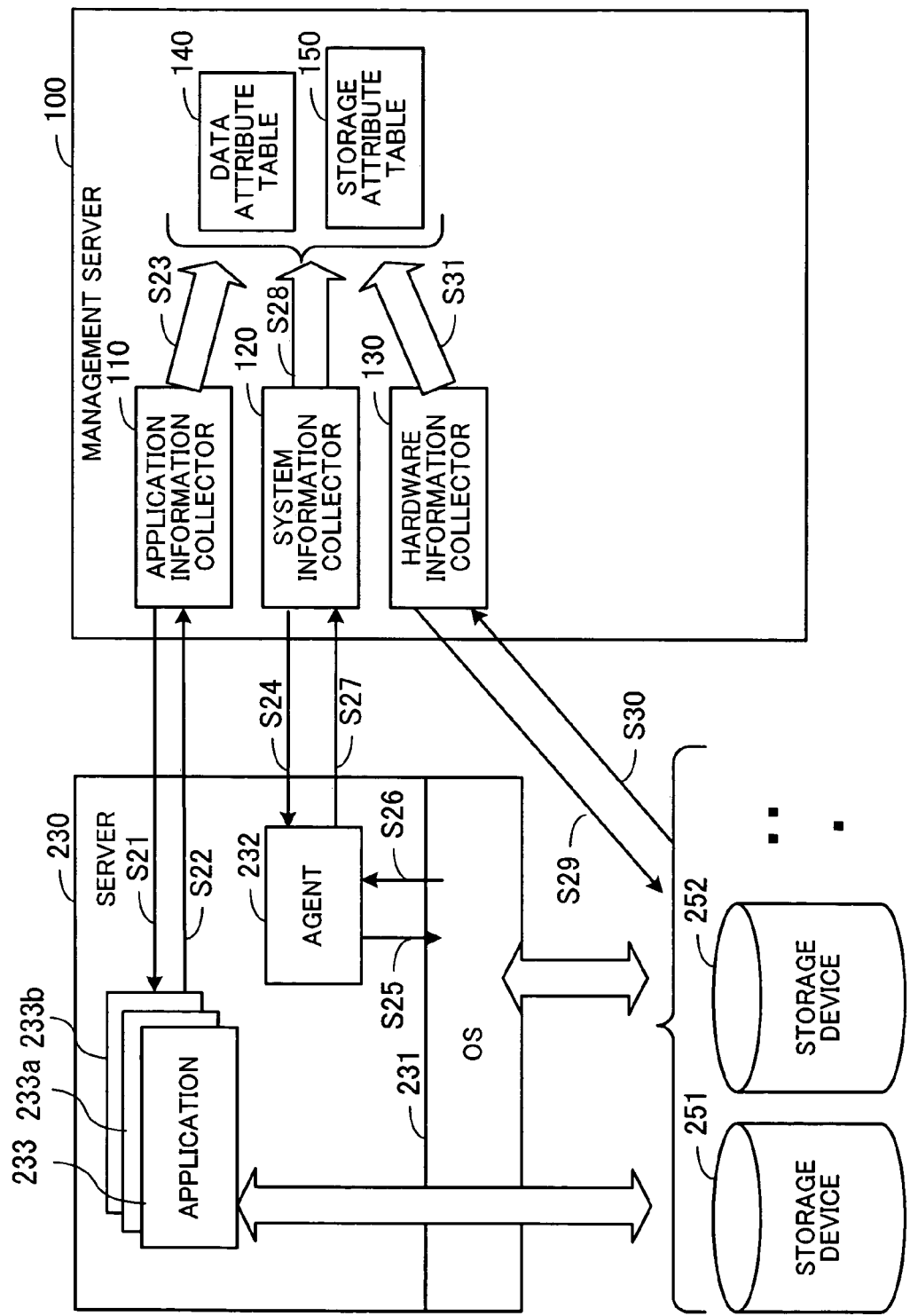
FIG. 8 is a block diagram showing an information collecting process.

FIG. 8 shows an information collecting process in block form. As shown in FIG. 8, the application information collector 110 searches for applications on the system. Then, the application information collector 110 requests the detected applications 233, 233a, 233b to send management information (step S21). The applications 233, 233a, 233b send the management information to the application information collector 110 (step S22). For example, an application for backing up data sends information as to a recovery frequency and whether backup is necessary or not, with respect to each data or each storage device. The application information collector 110 stores the management information sent from the applications 233, 233a, 233b in the data attribute table 140 and the storage attribute table 150 (step S23).

The system information collector 120 searches for a server group, and requests the agent 232 in the detected server 230 to send management information (step S24). The agent 232 accesses management information retained by the file systems and device drivers in the OS 231 (step S25). The agent 232 acquires the management information retained by the file systems and the device drivers (step S26). For example, the agent 232 acquires information as to the updated dates, the sizes, and the owners of data. The agent 232 sends the acquired management information to the system information collector 120 of the management server 100 (step S27). The system information collector 120 stores the received management information in the data attribute table 140 and the storage attribute table 150 (step S28).

The hardware information collector 130 accesses management information in the storage devices 251, 252, . . . (step S29). The hardware information collector 130 acquires the management information from the storage devices 251, 252, . . . (step S30). For example, the hardware information collector 130 acquires information as to I/O responses, used capacities of the storage devices, unused capacities (free capacities) of the storage devices, etc. The hardware information collector 130 stores the acquired management information in the data attribute table 140 and the storage attribute table 150 (step S31).

Figure 9:
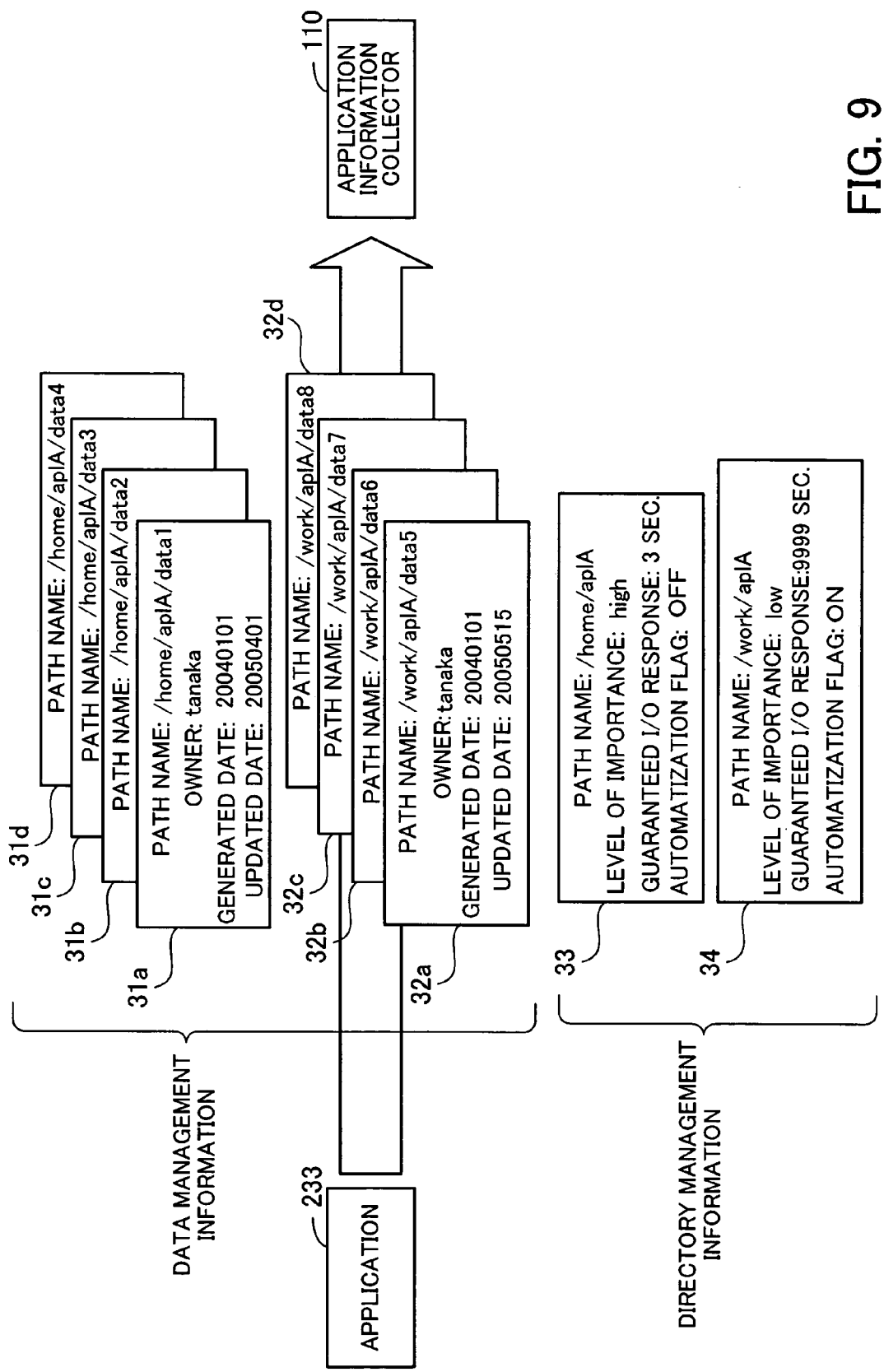
FIG. 9 is a diagram showing an example of management information collected from an application.

FIG. 9 shows an example of management information collected from an application. FIG. 9 illustrates data management information 31a, 31b, 31c, 31d, 32a, 32b, 32c, 32d and directory management information 33, 34.

The data management information 31a, 31b, 31c, 31d is management information with respect to a plurality of respective data in directories whose absolute path in the file systems is represented by "/home/aplA/". The data management information 32a, 32b, 32c, 32d is management information with respect to a plurality of respective data in directories whose absolute path in the file systems is represented by "/work/aplA/". The data management information 31a, 31b, 31c, 31d, 32a, 32b, 32c, 32d includes path names (file names added to the directory path), owners (data generators), generated dates, and updated dates.

The directory management information 33 is management information relative to a directory whose absolute path is represented by "/home/aplA/". The directory management information 34 is management information relative to a directory whose absolute path is represented by "/work/aplA/". The directory management information 33, 34 contains path names, levels of importance, guaranteed I/O response values, and automatization flags.

A level of importance indicates how much the service is affected when the data stored in the directory is lost. In the example shown in FIG. 9, the levels of importance are represented by high and low. A guaranteed I/O response value is an I/O response, i.e., a period of time required from an access to a response, to be guaranteed for an access to data in the directory. If an I/O response is not guaranteed, then the guaranteed I/O response value is set to a maximum value ("9999 seconds" in the example shown in FIG. 9) that can be set.

An automatization flag is a flag indicative of whether the system is to be automatically migrated or not. If the system is to be automatically migrated, then the automatization flag is set to "ON". If the system is not to be automatically migrated, then the automatization flag is set to "OFF".

Figure 10:
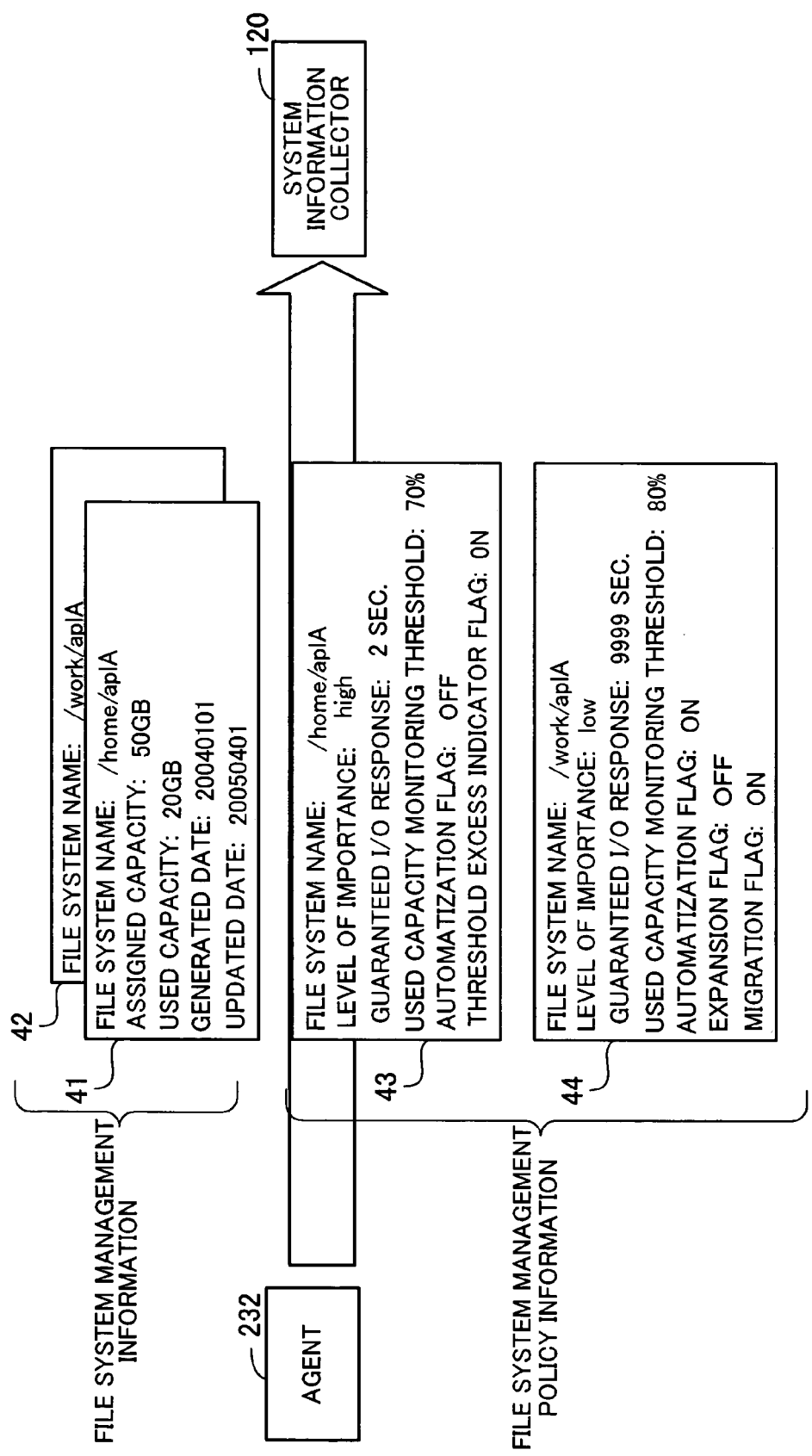
FIG. 10 is a diagram showing an example of management information collected from an agent.

FIG. 10 shows an example of management information collected from the agent 232. FIG. 10 illustrates file system management information 41, 42 and file system management policy information 43, 44 of the respective file systems.

The file system management information 41, 42 represents information of resources assigned to the file systems. Specifically, the file system management information 41, 42 contains file system names, assigned capacities, used capacities, generated dates, and updated dates.

The file system management policy information 43, 44 represents information serving as guidelines for managing the file systems. Specifically, the file system management policy information 43, 44 contains file system names, levels of importance, guaranteed I/O response values, used capacity monitoring thresholds, automatization flags, threshold excess indicator flags, expansion flags, and migration flags. A level of importance indicates how much the service is affected when the data managed by the file system is lost. In the example shown in FIG. 10, the levels of importance are represented by high and low. A guaranteed I/O response value is an I/O response, i.e., a period of time required from an access to a response, to be guaranteed for an access to data managed by the file system. If an I/O response is not guaranteed, then the guaranteed I/O response value is set to a maximum value ("9999 seconds" in the example shown in FIG. 10) that can be set.

A used capacity monitoring threshold is a threshold beyond which the free capacity of the file system is judged as being insufficient. The used capacity monitoring threshold is represented by the ratio (percentage) of the used capacity to the assigned capacity. If the used capacity exceeds the used capacity monitoring threshold, then the file system is judged as suffering a free capacity shortage.

An automatization flag is a flag indicative of whether the system is to be automatically migrated or not. If the system is to be automatically migrated, then the automatization flag is set to "ON". If the system is not to be automatically migrated, then the automatization flag is set to "OFF".

A threshold excess indicator flag is a flag indicative of whether the terminal of the administrator is to be notified or not when the used capacity of the file system exceeds a threshold. If the terminal of the administrator is to be notified, the threshold excess indicator flag is set to "ON". If the terminal of the administrator is not to be notified, the threshold excess indicator flag is set to "OFF". When the threshold excess indicator flag is "ON", information such as an electronic mail address or the like of the party to be notified is registered as a detailed setting.

An expansion flag is a flat indicative of whether the capacity of the file system is to be expanded or not. If the capacity of the file system is to be expanded, then the expansion flag is set to "ON". If the capacity of the file system is not to be expanded, then the expansion flag is set to "OFF".

A migration flag is a flag indicative of whether the file system is to be migrated or not. If the file system is to be migrated, then the migration flag is set to "ON". If the file system is not to be migrated, then the migration flag is set to "OFF". When the migration flag is "ON", then information required for migration, e.g., a performance to be required by a storage device to which data is to be transferred, is registered as detailed information.

Figure 11:
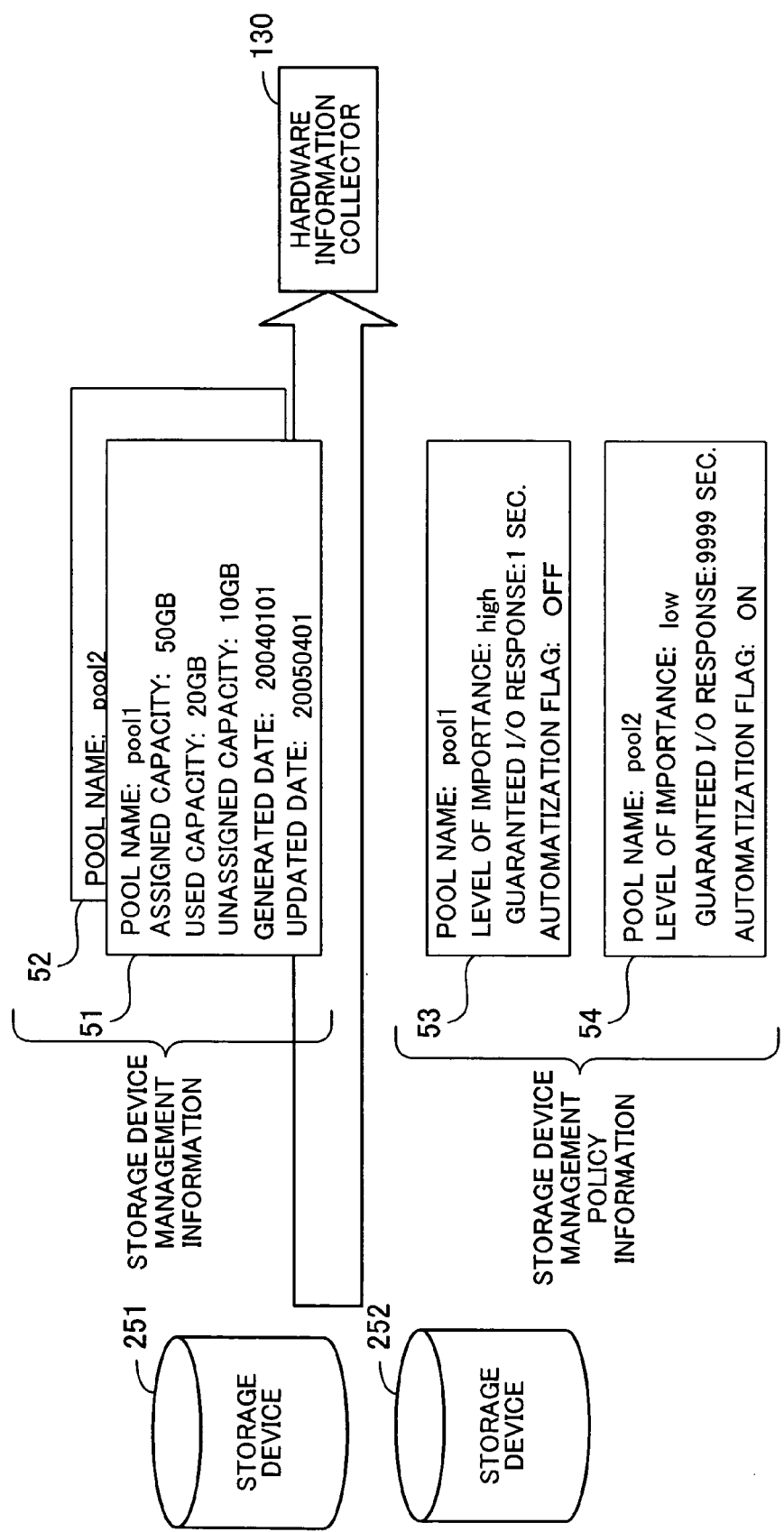
FIG. 11 is a diagram showing an example of management information collected from a storage device.

FIG. 11 shows an example of management information collected from a storage device. FIG. 11 illustrates storage device management information 51, 52 and storage device management policy information 53, 54.

The storage device management information 51, 52 represents information of resources assigned to the storage devices. Specifically, the storage device management information 51, 52 contains pool names (according to the present embodiment, a storage device to be managed for migration is referred to as "pool"), assigned capacities, used capacities, unassigned capacities, generated dates, and updated dates.

The storage device management policy information 53, 54 represents information serving as guidelines for managing the storage devices. Specifically, the storage device management policy information 53, 54 contains pool names, levels of importance, guaranteed I/O response values, and automatization flags. A level of importance indicates how much the service is affected when the data stored in the storage device is lost. In the example shown in FIG. 11, the levels of importance are represented by high and low. A guaranteed I/O response value is an I/O response to be guaranteed for access to data stored in the storage device. If an I/O response is not guaranteed, then the guaranteed I/O response value is set to a maximum value ("9999 seconds" in the example shown in FIG. 11) that can be set.

An automatization flag is a flag indicative of whether the system is to be automatically migrated or not. If the system is to be automatically migrated, then the automatization flag is set to "ON". If the system is not to be automatically migrated, then the automatization flag is set to "OFF".

The information analyzer 160 performs a tendency analysis based on the information shown in FIGS. 9 through 11. Results of the tendency analysis are displayed on the display monitor 11, and transmitted by electronic mail or the like to the system administrator. Examples of the results of the tendency analysis will be described below with reference to FIGS. 12 through 15.

Figure 12:
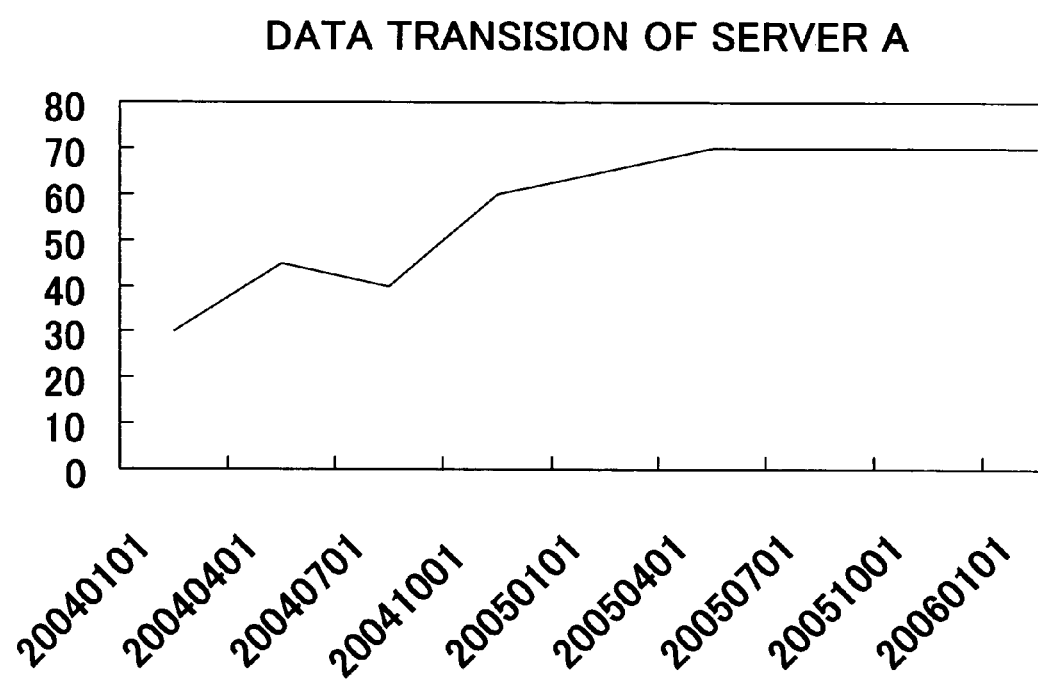
FIG. 12 is a diagram showing a transition which the amount of data managed by a server undergoes.

FIG. 12 shows a transition which the amount of data managed by a server undergoes. FIG. 12 illustrates a graph having a horizontal axis representing dates and a vertical axis ratios of data used by the server, i.e., percentages of values produced when used amounts of data are divided by assigned amounts of data. The used amounts of data and the assigned amounts of data are the sums of used amounts of data and assigned amounts of data in the file systems of the server.

Figure 13:
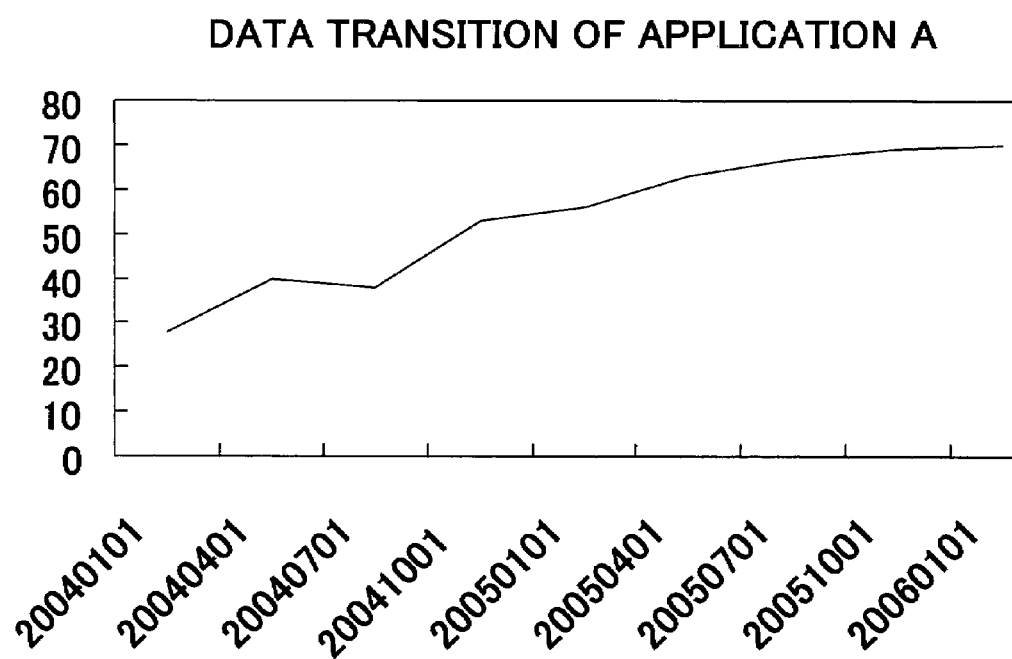
FIG. 13 is a diagram showing a transition which the amount of data used by an application undergoes.

FIG. 13 shows a transition which the amount of data used by an application undergoes. FIG. 13 illustrates a graph having a horizontal axis representing dates and a vertical axis ratios of data used by the application.

Figure 14:
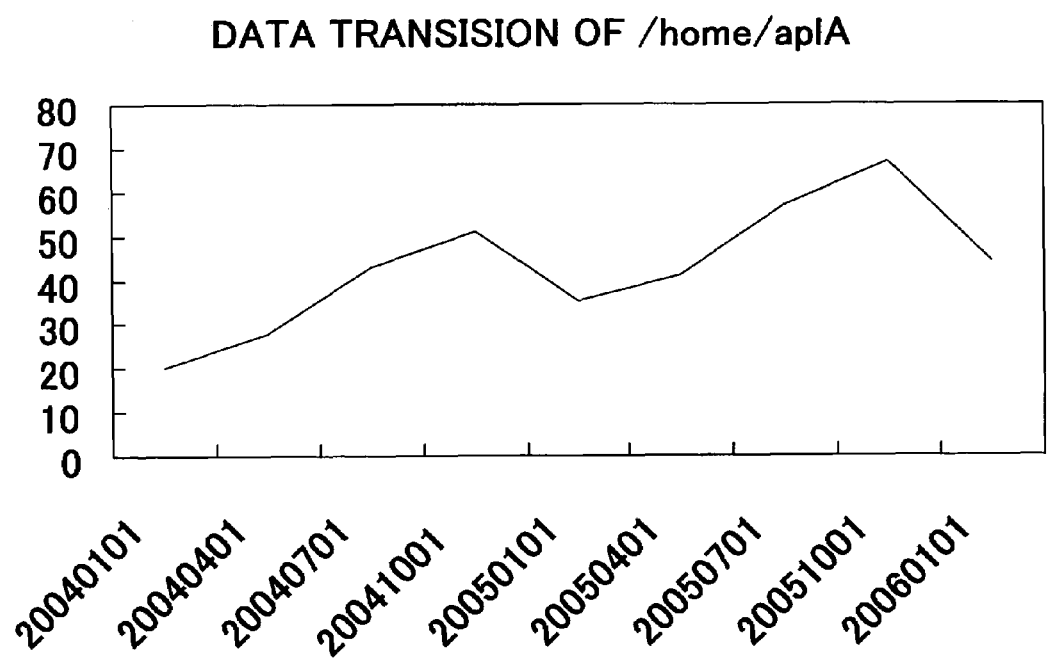
FIG. 14 is a diagram showing a transition which the amount of data managed by a file system undergoes.

FIG. 14 shows a transition which the amount of data managed by a file system undergoes. FIG. 14 illustrates a graph having a horizontal axis representing dates and a vertical axis ratios of data managed by a file system whose path is represented by "/home/aplA/".

Figure 15:
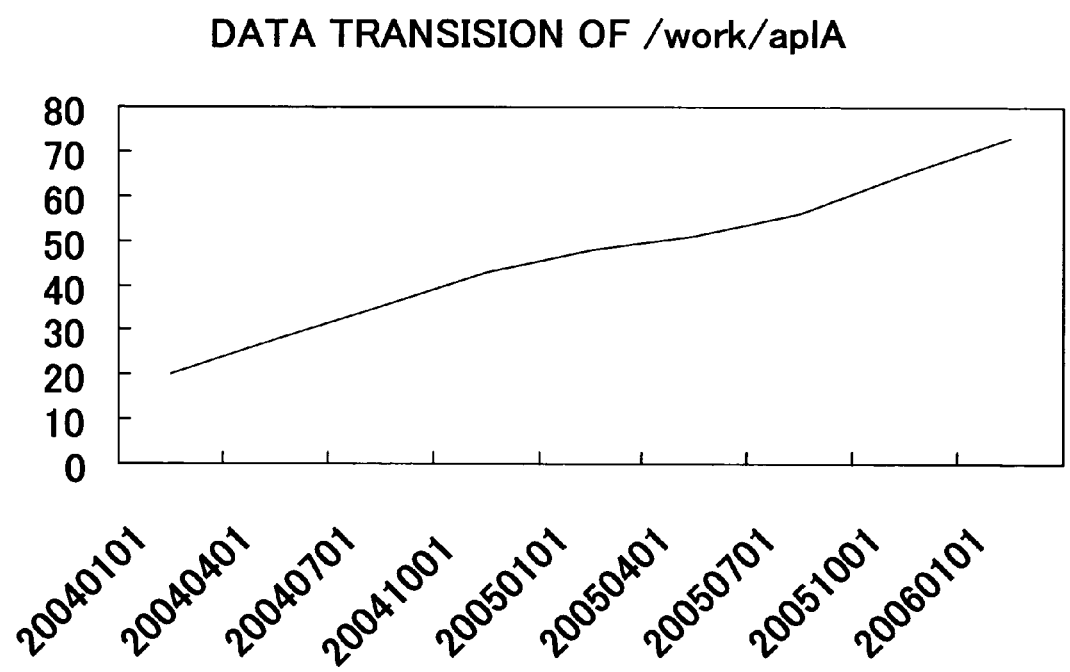
FIG. 15 is a diagram showing another transition which the amount of data managed by a file system undergoes.

FIG. 15 shows another transition which the amount of data managed by a file system undergoes. FIG. 14 illustrates a graph having a horizontal axis representing dates and a vertical axis ratios of data managed by a file system whose path is represented by "/work/aplA/".

The information collection and the tendency analysis as described above are performed according to a preset scanning schedule. Based on the collected management information, it is determined whether the amount of used data has exceeded a used capacity monitoring threshold or not according to an action schedule. If the amount of used data has exceeded a used capacity monitoring threshold with respect to any of the file systems, then the analytic result indicator 170 sends a threshold excess indication to the managing terminal device 20.

Figure 16:
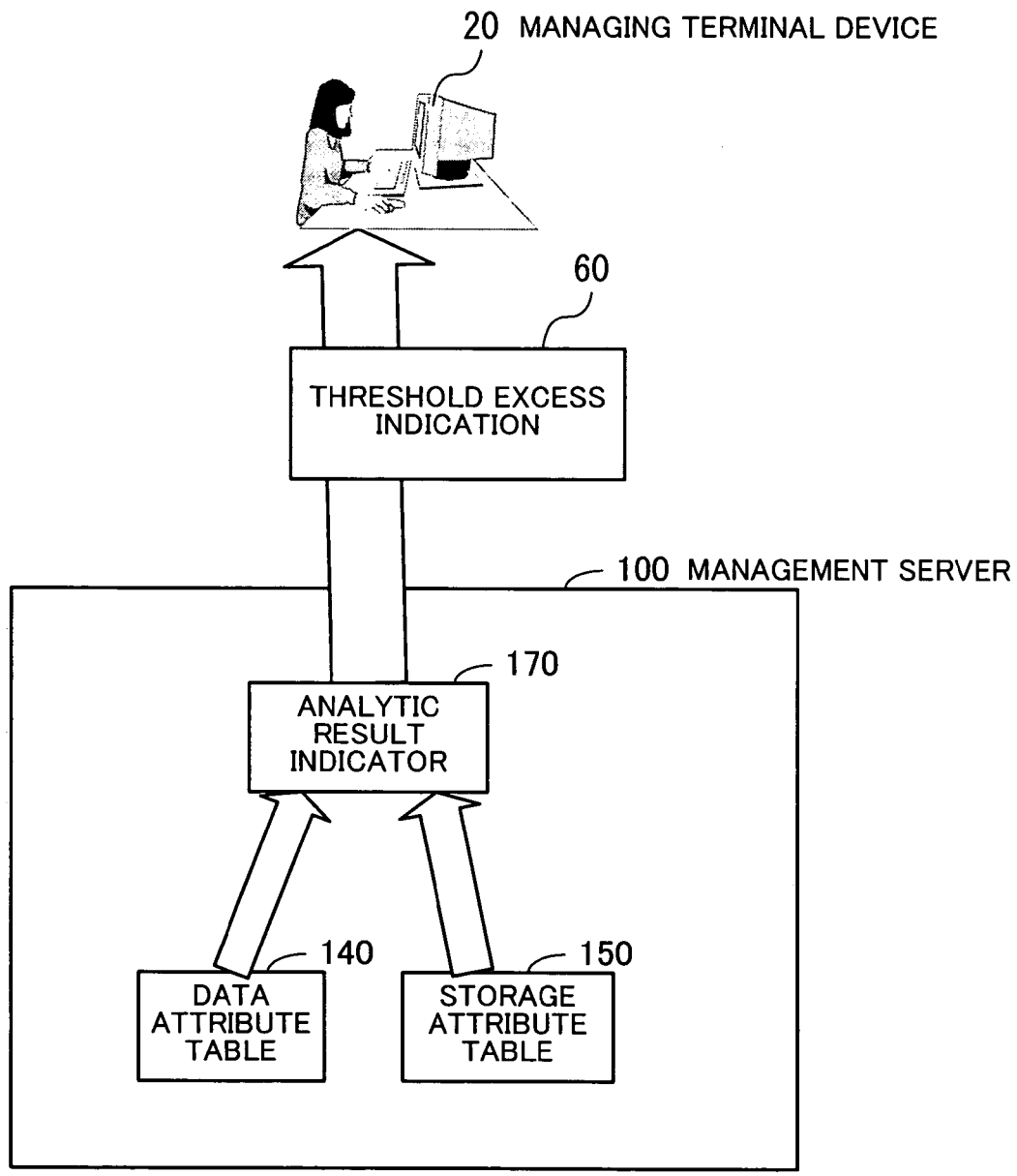
FIG. 16 is a block diagram showing the manner in which a threshold excess is indicated.

FIG. 16 shows the manner in which a threshold excess is indicated. The analytic result indicator 170 sends a threshold excess indication 60 to the managing terminal device 20, using electronic mail, for example.

If the system needs to be migrated, then the automatic migrator 180 migrates the system. For example, if the amount of data stored in a storage device has exceeded a used capacity monitoring threshold, then part of the stored data is transferred from the storage device to another storage device.

Figure 17:
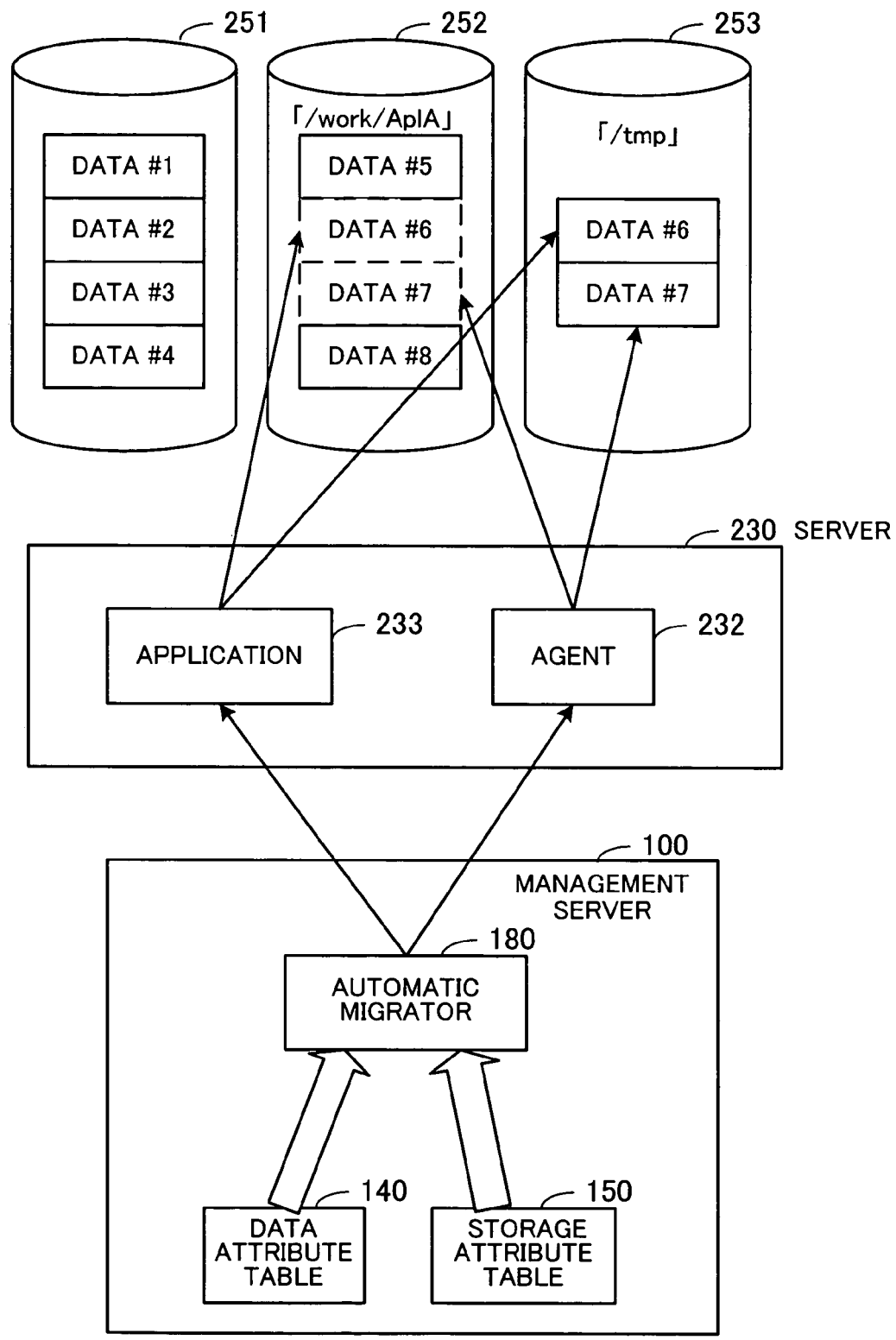
FIG. 17 is a block diagram showing the manner in which a system migration occurs.

FIG. 17 shows the manner in which a system migration occurs. As shown in FIG. 17, the automatic migrator 180 instructs the agent 232 to transfer data from the storage device 252 to the other storage device 253. Similarly, the automatic migrator 180 instructs the application 233 to transfer data from the storage device 252 to the other storage device 253.

For example, the automatic migrator 180 moves data in the directory "/work/AplA/" which has been unaccessed for 300 days to a directory called "/tmp". The directory "/tmp" is present in a storage device that is cheaper and slower in access speed than the storage device having the directory "/work/AplA/". As a result of the migration, the efficiency of usage of resources in the system is increased. In this case, however, the levels of importance of the data shown in FIG. 5, the performances of the storage devices shown in FIG. 6, and the levels of importance and the guaranteed I/O response values in the directory management information shown in FIG. 9 need to be the same as each other.

Other examples of automatic migrations will be described below.

Figure 18:
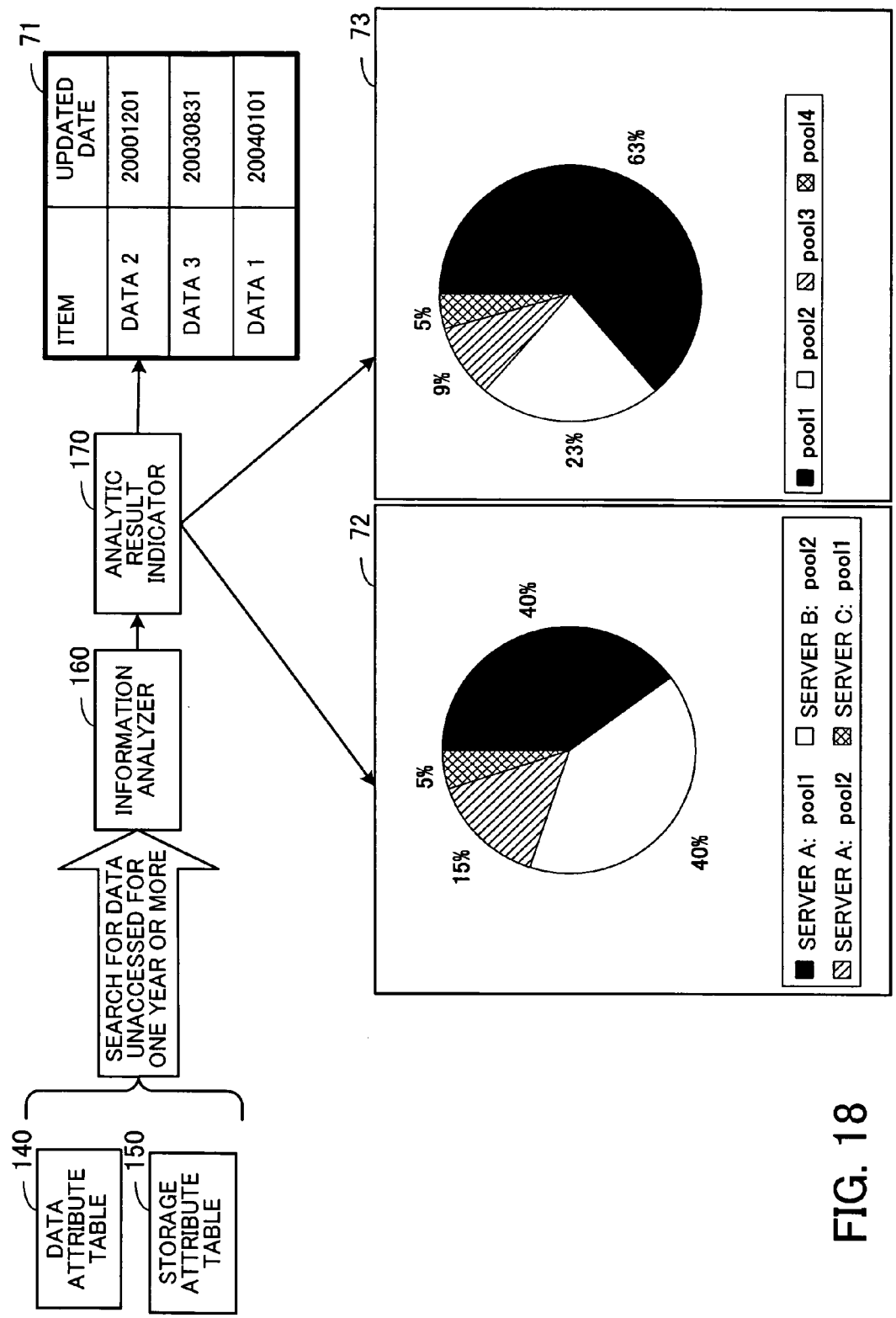
FIG. 18 is a diagram, partly in block form, showing results of a tendency analysis of data that has not been used for a long period of time.

FIG. 18 shows, partly in block form, results of a tendency analysis of data that has not been used for a long period of time. As shown in FIG. 18, the information analyzer 160 refers to the data attribute table 140 and searches for data that has been unaccessed for one year or more. The information analyzer 160 also refers to the storage attribute table 150 and locates a storage device storing data that has been unaccessed for one year or more. The information analyzer 160 performs a tendency analysis on the acquired data, and the analytic result indicator 170 sends results of the tendency analysis to the managing terminal device 20.

The analytic results are sent in the form of a data list 71, a server-dependent data distribution table 72, and a storage-device-dependent data distribution table 73.

The data list 71 is a list of registered data not accessed for one year or more.

The server-dependent data distribution table 72 is represented by a circle graph showing a distribution of data not accessed for one year or more among servers. It can be determined from system configuration information, not shown, which server can access each of the storage devices.

The storage-device-dependent data distribution table 73 is represented by a circle graph showing a distribution of data not accessed for one year or more among storage devices.

These results of the tendency analysis show that data which has been unaccessed for a long period of time is disproportionately present in the storage device "pool1". Therefore, the automatic migrator 180 controls the applications 233, 233a, 233b and the agent 232 to transfer the data which has been unaccessed for a long period of time in the storage device "pool1" to another storage device. In this fashion, the frequencies of data access to the storage devices are uniformized.

Figure 19:
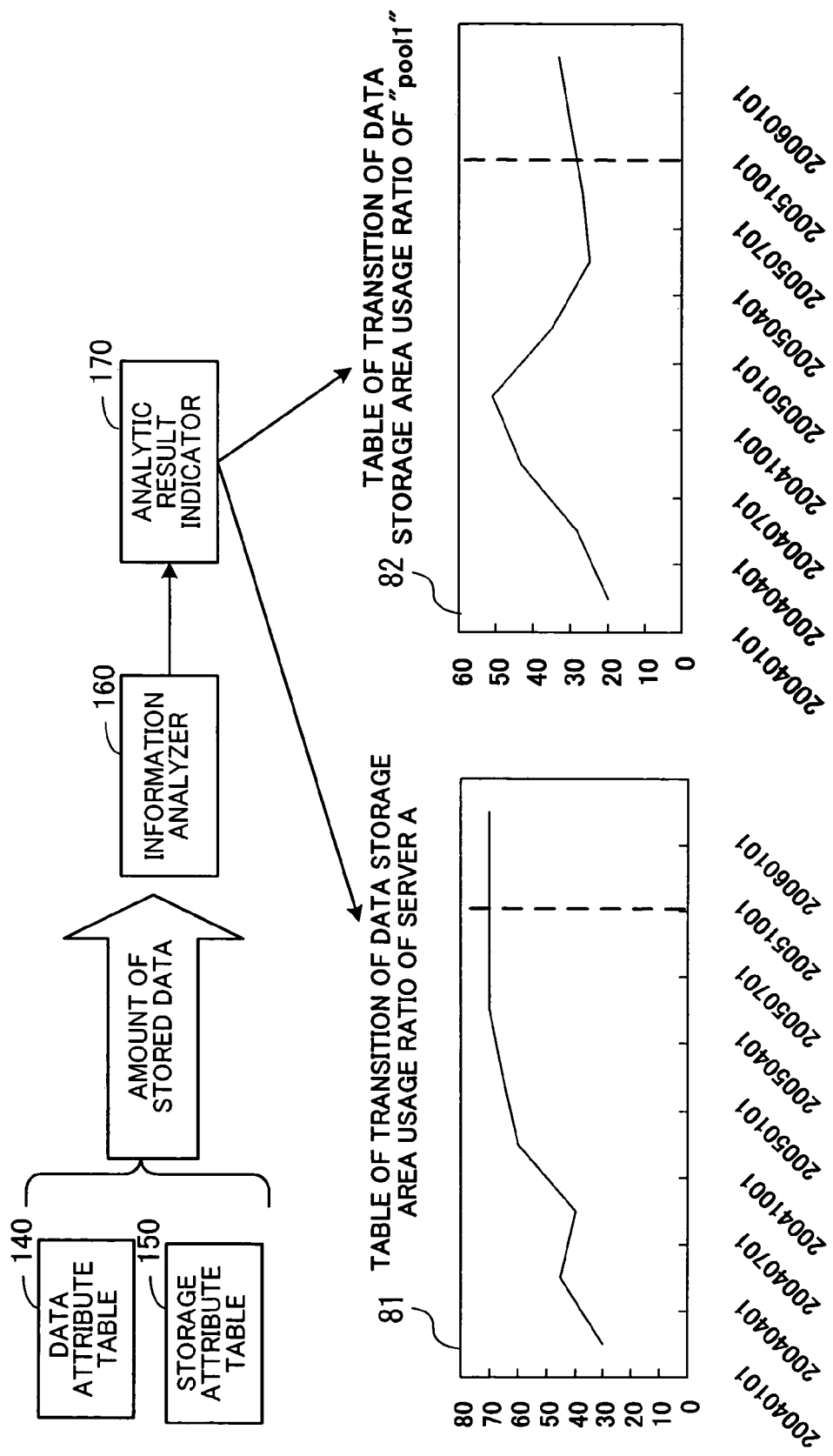
FIG. 19 is a diagram, partly in block form, showing results of a tendency analysis of a stored amount of data as it changes from the past to the future.

FIG. 19 shows, partly in block form, results of a tendency analysis of a stored amount of data as it changes from the past to the future. As shown in FIG. 19, the information analyzer 160 refers to the data attribute table 140 and the storage attribute table 150 and determines data storage area usage ratios of the respective servers and the respective storage devices. The information analyzer 160 periodically determines data storage area usage ratios over a continuous period of time. The information analyzer 160 analyzes a transition of data storage area usage ratios in the past and predicts a transition of data storage area usage ratios in the future. The analytic result indicator 170 sends analyzed results of the transitions of the data storage area usage ratios of the respective servers and the storage devices in the past and the future, to the managing terminal device 20.

In the example shown in FIG. 19, the analytic result indicator 170 sends a table 81 representing a transition of data storage area usage ratios of a server A and a table 82 representing a transition of data storage area usage ratios of the storage device "pool1", as analytic results representing data at the time of Oct. 01, 2005 to the managing terminal device 20. It can be understood from these tables 81, 82 that the data storage area usage ratio of the server A has not been changed largely, but the data storage area usage ratio of the storage device "pool1", which is highly expensive, has a growing tendency.

Figure 20:
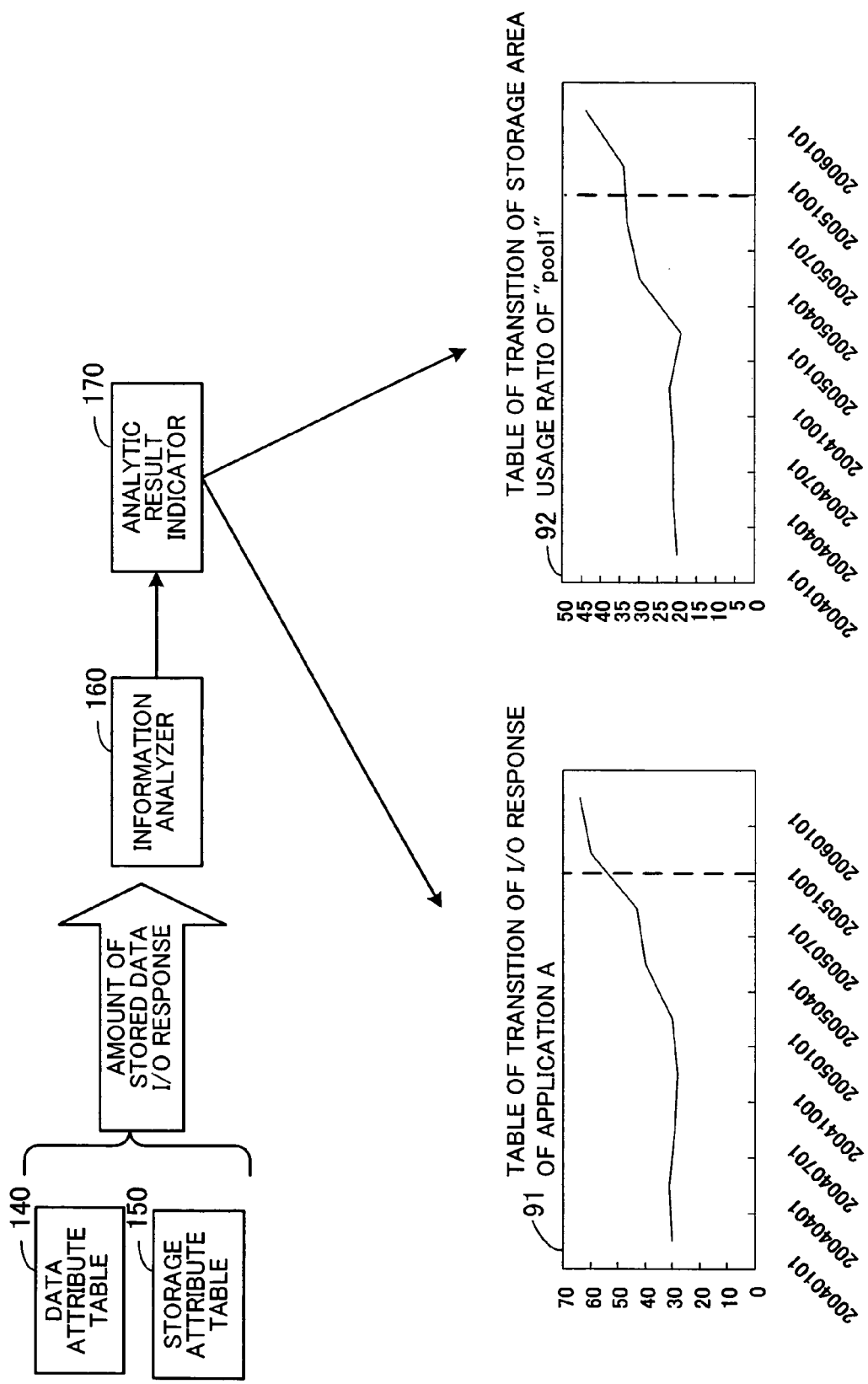
FIG. 20 is a diagram, partly in block form, showing results of a tendency analysis of an I/O response and a data storage area usage ratio.

FIG. 20 shows, partly in block form, results of a tendency analysis of an I/O response and a data storage area usage ratio. As shown in FIG. 20, the information analyzer 160 refers to the data attribute table 140 and the storage attribute table 150 and determines I/O responses of the respective applications and data storage area usage ratios of the respective storage devices. The information analyzer 160 periodically determines I/O responses and data storage area usage ratios over a continuous period of time. The information analyzer 160 analyzes a transition of I/O responses of the applications in the past and predicts a transition of I/O responses of the applications in the future. The information analyzer 160 also analyzes a transition of data storage area usage ratios of the respective storage devices in the past and predicts a transition of data storage area usage ratios of the respective storage devices in the future. The analytic result indicator 170 sends analyzed results of the transitions of the I/O responses of the applications and the data storage area usage ratios of the storage devices to the managing terminal device 20.

In the example shown in FIG. 20, the analytic result indicator 170 sends a table 91 representing a transition of I/O responses of an application A and a table 92 representing a transition of data storage area usage ratios of the storage device "pool1", as analytic results representing data at the time of Oct. 01, 2005 to the managing terminal device 20. A review of these tables 91, 92 indicates that the I/O responses of the application A are poor and the data storage area usage ratio of the storage device "pool1" has a growing tendency. Therefore, it can be estimated that a reduction in the free storage capacity of the storage device has made the I/O responses of the application A poor. In this case, the analytic result indicator 170 sends the system administrator a message proposing that the used storage area of the storage device "pool1" should be reduced by transferring data therefrom to another storage device.

Figure 21:
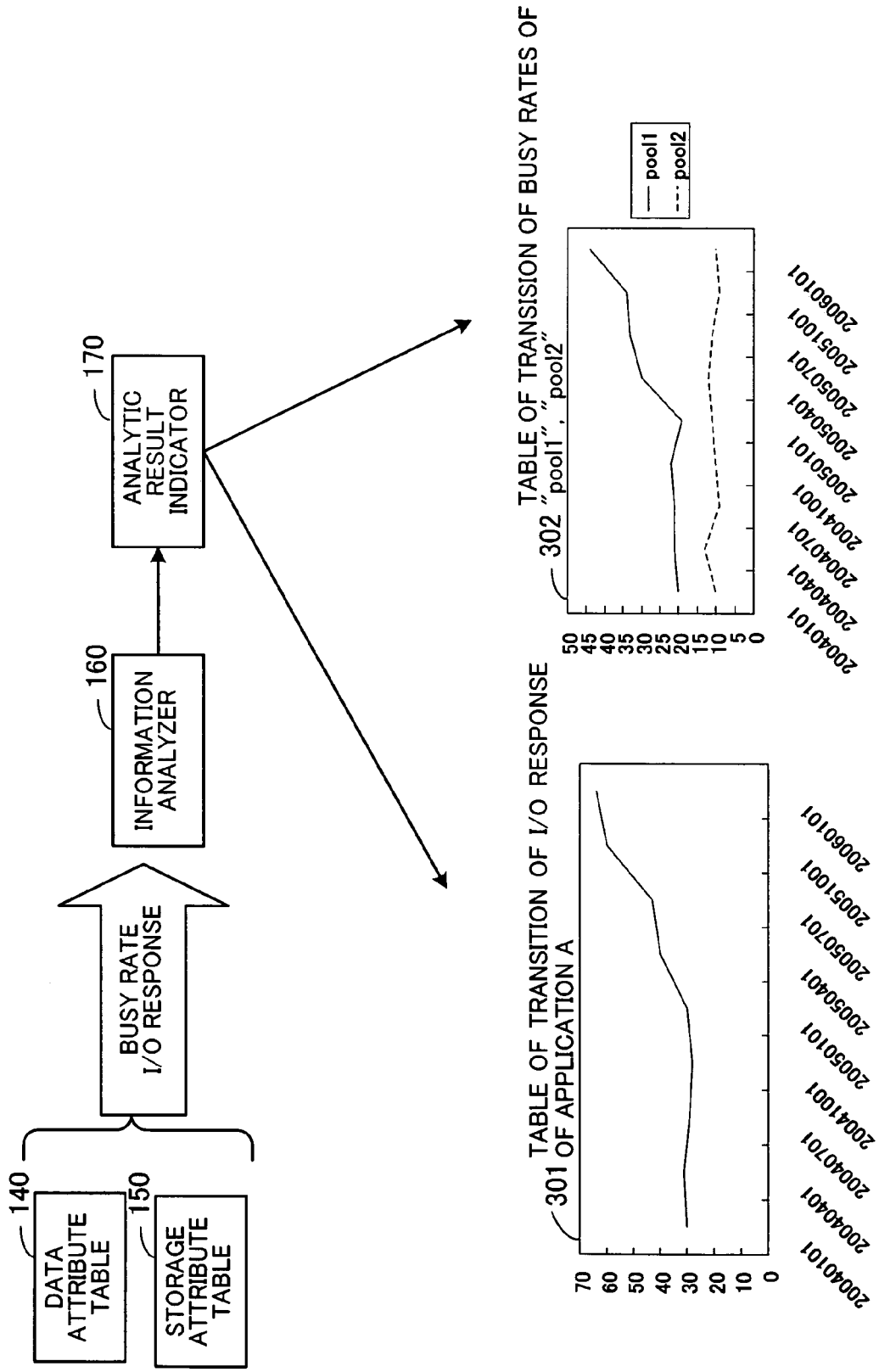
FIG. 21 is a diagram, partly in block form, showing results of a tendency analysis of a busy rate and an I/O response.

FIG. 21 shows, partly in block form, results of a tendency analysis of a busy rate and an I/O response. As shown in FIG. 21, the information analyzer 160 refers to the data attribute table 140 and the storage attribute table 150 and determines I/O responses of the respective applications and busy rates of the respective storage devices. It is assumed that busy rates of the respective storage devices have been retrieved from the storage devices by the hardware information collector 130 and additionally registered in the storage attribute table 150 shown in FIG. 6. The information analyzer 160 periodically determines I/O responses and busy rates over a continuous period of time. The information analyzer 160 analyzes a transition of I/O responses of the applications in the past and predicts a transition of I/O responses of the applications in the future. The information analyzer 160 also analyzes a transition of busy rates of the respective storage devices in the past and predicts a transition of busy rates of the respective storage devices in the future. The analytic result indicator 170 sends analyzed results of the transitions of the I/O responses of the applications and the busy rates of the storage devices to the managing terminal device 20.

In the example shown in FIG. 21, the analytic result indicator 170 sends a table 301 representing a transition of I/O responses of the application A and a table 302 representing a transition of busy rates of the storage devices "pool1", "pool2", as analytic results representing data at the time of Oct. 01, 2005 to the managing terminal device 20. A review of these tables 301, 302 indicates that the I/O responses of the application A are poor and the busy rate of the storage device "pool1" has a growing tendency. Therefore, it can be estimated that a concentration of access to the storage device has made the I/O responses of the application A poor. In this case, the analytic result indicator 170 sends the system administrator a message proposing that data should be transferred from the storage device "pool1" to the storage device "pool2". The transfer of data will increase the I/O response of the application A.

The automatic migrator 180 may automatically transfer data from a storage device to another storage device without the need for sending the analytic results to the system administrator. For example, the automatic migrator 180 may be arranged such that when the busy rate of a storage device approaches a predetermined value, e.g., 30%, the automatic migrator 180 transfers data from the storage device having the high busy rate to another storage device having a low busy rate in order to prevent the high busy rate from exceeding the predetermined value.

Figure 22:
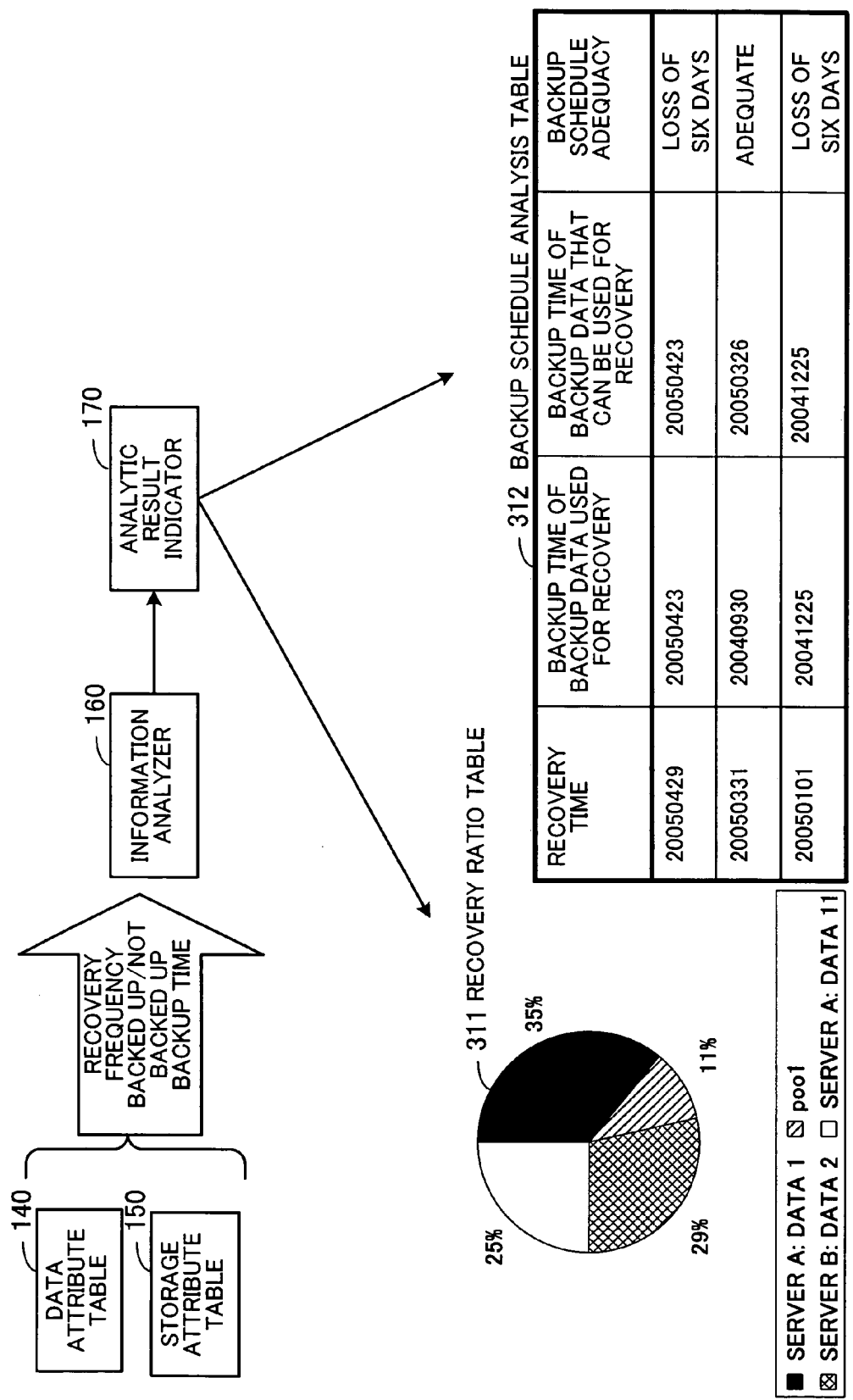
FIG. 22 is a diagram, partly in block form, showing results of an adequacy analysis of a backup schedule based on a tendency analysis of recovery frequency.

FIG. 22 shows, partly in block form, results of an adequacy analysis of a backup schedule based on a tendency analysis of recovery frequency. As shown in FIG. 22, the information analyzer 160 refers to the data attribute table 140 and the storage attribute table 150, and judges recovery frequencies of respective data, whether the data need to be backed up or not, and backup times of the respective data. It is assumed that the backup times of data have been retrieved from a backup application by the application information collector 110 and additionally registered in the data attribute table 140 shown in FIG. 5. The information analyzer 160 periodically determines recovery frequencies, whether data needs to be backed up or not, and backup times over a continuous period of time. The information analyzer 160 analyzes ratios of a recovery action, i.e., an action to return backup data to an original storage device, on data or storage devices, and also analyzes the adequacy of a backup schedule. The analytic result indicator 170 sends analyzed results of the recovery action ratios and the backup schedule adequacy to the managing terminal device 20.

In the example shown in FIG. 22, the analytic result indicator 170 sends a recovery ratio table 311 and a backup schedule analysis table 312 as the analytic results to the managing terminal device 20. The adequacy of a backup schedule is determined by comparing the backup time of backup data used for recovery and the backup time of latest backup data that can be used for recovery with each other.

If the backup time of the backup data used for recovery is earlier than the backup time of the latest backup data that can be used for recovery, then the backup schedule is judged as being adequate. If the backup time of the backup data used for recovery is the same as the backup time of the latest backup data that can be used for recovery, it is judged that there has been a loss of data, i.e., a loss of data to be recovered, between the backup time of the backup data and a recovery time.

The information analyzer 160 can also list data on a backup schedule that have not been recovered within a predetermined period of time, as analytic results of the adequacy of the backup schedule based on the tendency analysis of recovery frequency.

Figure 23:
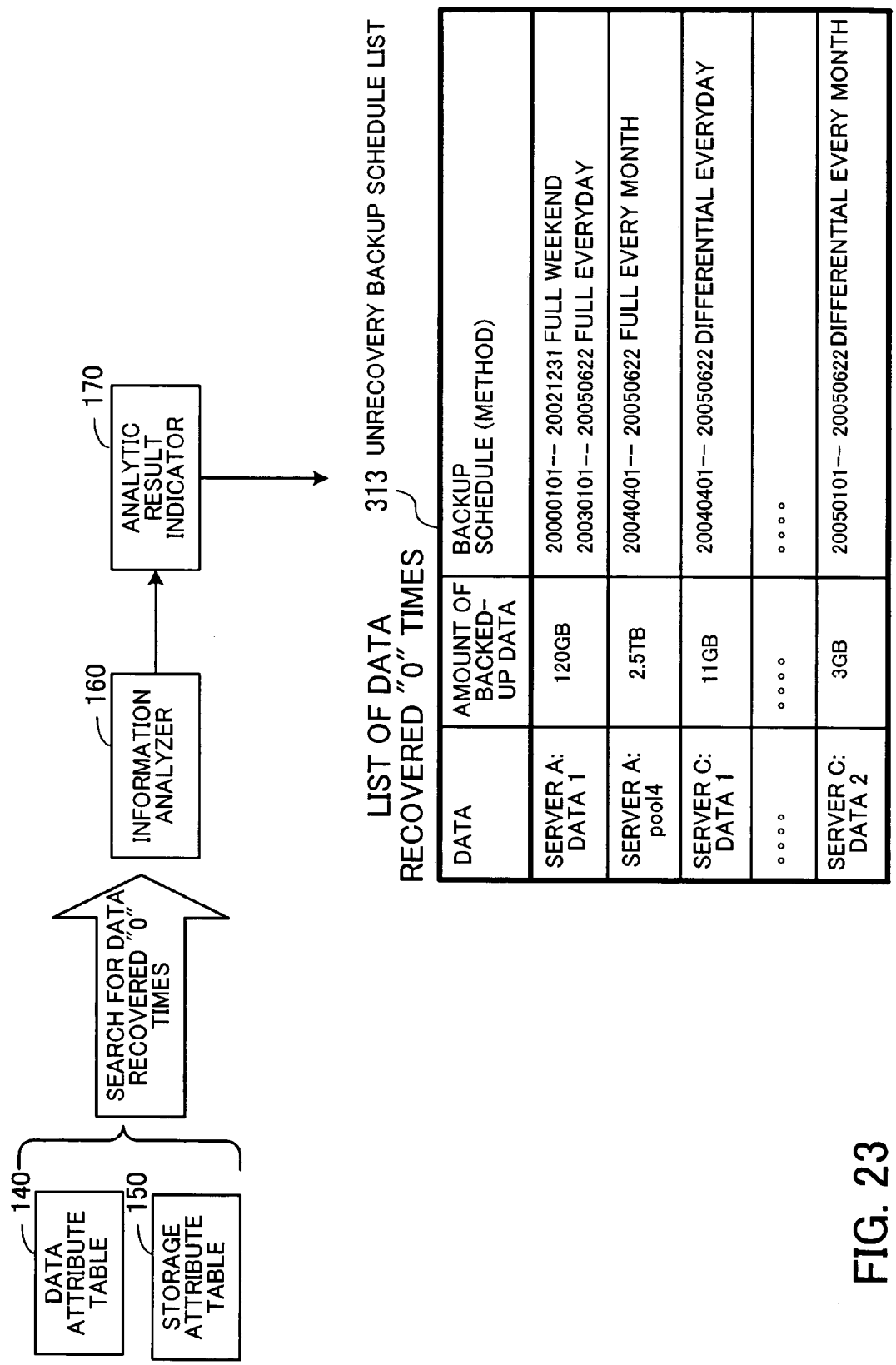
FIG. 23 is a diagram, partly in block form, showing results of an analysis of an unrecovery backup schedule.

FIG. 23 shows, partly in block form, results of an analysis of an unrecovery backup schedule. As shown in FIG. 23, the information analyzer 160 searches the data attribute table 140 and the storage attribute table 150 for data that has been recovered "0" times, and generates an unrecovery backup schedule list 313. The analytic result indicator 170 sends the unrecovery backup schedule list 313 to the managing terminal device 20.

The unrecovery backup schedule list 313 contains a list of data that have been recovered "0" times within a predetermined period of time. In the example shown in FIG. 23, the unrecovery backup schedule list 313 also contains backed-up amounts of those unrecovered data and their backup schedules.

The system administrator can stop an unwanted backup process by referring to the unrecovery backup schedule list 313.

The information analyzer 160 can also detect setting omissions of a backup schedule.

Figure 24:
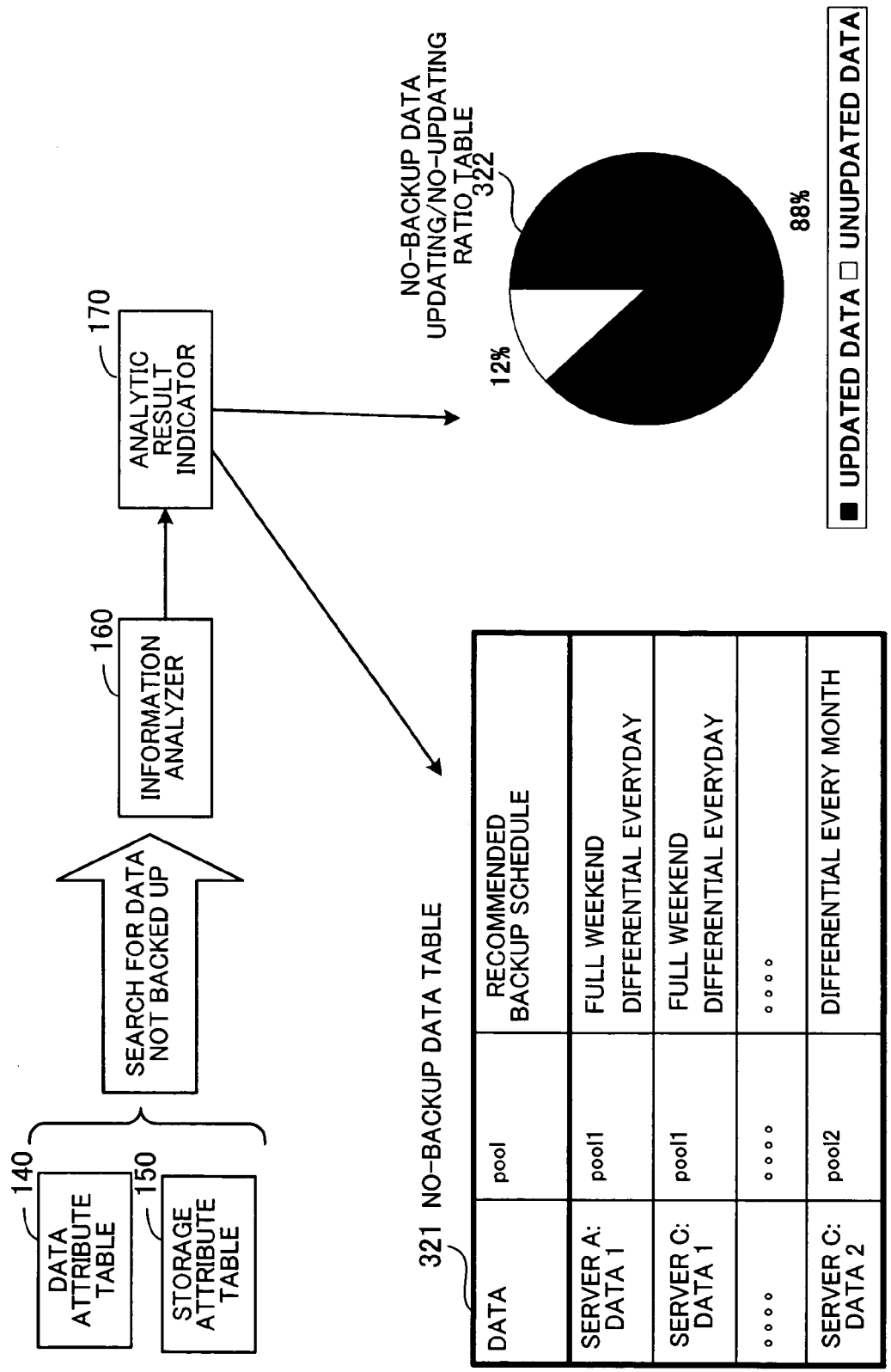
FIG. 24 is a diagram, partly in block form, showing results of an analysis of setting omissions of a backup schedule.

FIG. 24 shows, partly in block form, results of an analysis of setting omissions of a backup schedule. As shown in FIG. 24, the information analyzer 160 searches the data attribute table 140 and the storage attribute table 150 for data that has a backup setting "NO", and determines whether those pieces of data are updated or not within a predetermined period of time. Then, the information analyzer 160 generates a no-backup data table 321 and a no-backup data updating/no-updating ratio table 322. The analytic result indicator 170 sends the no-backup data table 321 and the no-backup data updating/no-updating ratio table 322 to the managing terminal device 20.

The no-backup data table 321 lists data whose backup settings are "NO". Each of the data is combined with settings including the name (pool number) of a storage device which stores the data and a recommended backup schedule.

The recommended backup schedule for data is determined depending on the frequency at which the data is to be updated and the level of importance of the data. For example, as the level of importance of data is higher, the data is backed up at shorter backup intervals, and as the updating interval of data is shorter, the data is backed up at shorter backup intervals.

The no-backup data updating/no-updating ratio table 322 is represented by a circle graph showing the ratios of data that has been updated within a predetermined period of time and data that has not been updated, of no-backup data. The no-backup data updating/no-updating ratio table 322 is generated for each of the storage devices.

As described above, since an operational plan for the system is calculated based on a combination of the management information that the applications have, the management information that the OS has, and the management information that the storage devices have, the system can be operated efficiently.

For example, information as to the frequency at which each data is accessed is acquired from the applications, and the data whose access frequency is low are transferred to a low-speed, inexpensive storage device. In this manner, the storage devices has their ROI increased.

By acquiring management information as to the I/O responses of storage devices from the applications, etc., a reduction in the I/O responses can easily be found out. When the I/O response of a storage device is reduced, part of the data stored in the storage device can be transferred to another storage device.

In backup management, the adequacy of a backup schedule can be determined in view of the updated state of data. Consequently, any processes to be performed to handle a situation that occurs in the event of a fault are minimized.

Of the data managed by the OS, data that escapes from a backup schedule can be detected. Therefore, important data is reliably backed up without fail.

Furthermore, management information is collected by polling when necessary, e.g., when the system configuration is changed. Consequently, any burdens imposed on the system by collecting management information are reduced. As a result, even if the system is of a large scale, it can monitor data access from the applications.

The processing functions described above can be implemented by a computer. The computer executes a program which is descriptive of the details of the functions to be performed by the management server, thereby carrying out the processing functions. The program can be recorded on recording mediums that can be read by the computer. Recording mediums that can be read by the computer include a magnetic recording device, an optical disc, a magneto-optical recording medium, a semiconductor memory, etc. Magnetic recording devices include a hard disk drive (HDD), a floppy disk (FD), a magnetic tape, etc. Optical discs include a DVD (Digital Versatile Disc), a DVD-RAM (Digital Versatile Disc Random-Access Memory), a CD-ROM (Compact Disc Read-Only Memory), a CD-R (Recordable)/RW (ReWritable), etc. Magneto-optical recording mediums include an MO (Magneto-Optical) disk.

For distributing the program, portable recording mediums such as DVDs, CD-ROMs, etc. which store the program are offered for sale. Furthermore, the program may be stored in a memory of the server computer, and then transferred from the server computer to another client computer via a network.

The computer which executes the program stores the program stored in a portable recording medium or transferred from the server computer into its own memory. Then, the computer reads the program from its own memory, and performs processing sequences according to the program. Alternatively, the computer may directly read the program from the portable recording medium and perform processing sequences according to the program. Further alternatively, each time the computer receives a program segment from the server computer, the computer may perform a processing sequence according to the received program segment.

According to the present invention, inasmuch the adequacy of the management of resources is determined using management information representing data access from application functions, the adequacy of the management of resources can appropriately be determined.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A recording medium readable by a computer and storing a system managing program for assisting in optimizing a system configuration by enabling said computer to function as:

application information collecting means for acquiring management information representing backup and recovery of data from an application function which is realized when a server of a network system executes an application program, and registering the acquired management information in a system management table;

system information collecting means for collecting management information on data management by a file system from an operating system of said server, and registering the collected management information in said system management table; and information analyzing means for referring to said system management table and determining whether the adequacy of said backup schedule by comparing a backup time of backup data that was actually used in recovery and a backup time of latest backup data that can be used for recovery with each other;

wherein said information analyzing means judges that said backup schedule is adequate if the backup time of the backup data that was actually used in recovery is earlier than the backup time of the latest backup data that can be used for recovery.

2. The recording medium according to claim 1, wherein said system managing program enables said computer to function as:

analytic result indicating means for indicating analytic results from said information analyzing means to a terminal device used by a system administrator.

3. The recording medium according to claim 1, wherein said information analyzing means lists data which has been backed up and which has not been recovered for a predetermined period of time.

4. The recording medium according to claim 1, wherein said information analyzing means lists data which has escaped from from said backup schedule provided by said application function, of data managed by said operating system.

5. The recording medium readable by a computer and storing a system managing program for assisting in optimizing a system configuration by enabling said computer to function as:

application information collecting means for acquiring management information representing backup and recovery of data from an application function which is realized when a server of a network system executes an application program, and registering the acquired management information in a system management table;

system information collecting means for collecting management information on data managed by a file system from an operating system of said server, and registering the collected management information in said system management table; and information analyzing means for referring to said system management table and determining the adequacy of said backup schedule by comparing a backup time of backup data that was actually used in recovery and a backup time of latest backup data that can be used for recovery with each other;

wherein said information analyzing means judges that said backup schedule is inadequate if the backup time of the backup data that was actually used in recovery is the same as the backup time of the latest backup data that can be used for recovery.

6. A system managing method for assisting in optimizing a system configuration based on a processing operation of a computer, comprising:

acquiring management information representing backup and recovery of data from an application function which is realized when a server of a network system executes an application program, and registering the acquired management information in a system management table;

collecting management information on data management by a file system from an operating system of said server, and registering the collected management information in said system management table; and referring to said system management table and determining whether a backup schedule provided by said application function is acceptable, by comparing a backup time of backup data that was actually used in recovery with backup time of latest backup data that can be used for recovery;

wherein judging that said backup schedule is adequate if the backup time of the backup data that was actually used in recovery is earlier than the backup time of the latest backup data that can be used for recovery.

7. A system managing apparatus for assisting in optimizing a system configuration, comprising:

application information collecting means for acquiring management information representing backup and recovery of data from an application function which is realized when a server of a network system executes an application program, and registering the acquired management information in a system management table;

system information collecting means for collecting management information on data managed by a file system from an operating system of said server, and registering the collected management information in said system management table; and information analyzing means for referring to said system management table and determining whether the backup schedule provided by said application function is acceptable, by comparing a backup time of backup data that was actually used in recovery with a backup time of latest backup data that can be used for recovery;

wherein said information analyzing means judges that said backup schedule is adequate if the backup time of the backup data that was actually used in recovery is earlier than the backup time of the latest backup data that can be used for recovery.

* * * * *